(12) United States Patent
Borden et al.

(10) Patent No.: US 12,056,149 B1
(45) Date of Patent: Aug. 6, 2024

(54) VISUAL ANALYSIS PLATFORM UTILIZING DYNAMIC GROUP DATA ELEMENTS IN CUSTOM CALCULATIONS

(71) Applicant: Tableau Software, LLC, Seattle, WA (US)

(72) Inventors: Nicolas Ratigan Borden, Seattle, WA (US); Thomas Nhan, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 105 days.

(21) Appl. No.: 17/357,785

(22) Filed: Jun. 24, 2021

(51) Int. Cl.
| | |
|---|---|
| *G06F 16/26* | (2019.01) |
| *G06F 16/21* | (2019.01) |
| *G06F 16/2455* | (2019.01) |
| *G06F 16/2457* | (2019.01) |
| *G06F 16/248* | (2019.01) |

(52) U.S. Cl.
CPC ........... *G06F 16/26* (2019.01); *G06F 16/211* (2019.01); *G06F 16/24554* (2019.01); *G06F 16/2457* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 9,779,147 | B1* | 10/2017 | Sherman | G06F 16/2423 |
| 10,152,203 | B1* | 12/2018 | Kim | G06F 3/0482 |
| 2005/0039033 | A1* | 2/2005 | Meyers | G06F 16/284 |
| | | | | 713/193 |
| 2014/0282187 | A1* | 9/2014 | Mackinlay | G06F 3/0484 |
| | | | | 715/771 |
| 2018/0173707 | A1* | 6/2018 | Su | G06F 16/252 |
| 2019/0087449 | A1* | 3/2019 | Rybacki | G06F 3/0482 |
| 2019/0108272 | A1* | 4/2019 | Talbot | G06F 16/2282 |

* cited by examiner

*Primary Examiner* — Dawaune A Conyers
(74) *Attorney, Agent, or Firm* — Morgan, Lewis & Bockius LLP

(57) ABSTRACT

A method for generating data visualizations includes receiving user selection of a data source, and receiving user input to define a dynamic set according to: (i) user selection of visual marks in a visualization region and/or (ii) user specification of a parameter corresponding to data fields in the data source. The method also includes receiving user input to define a calculation to compare data values for a data field from the data source to data values in the dynamic set. The method further includes identifying a set of rows from the data source whose data values are included in the dynamic set. The method also includes receiving user input to place a data field from the data source in a shelf region, and displaying a data visualization that includes a plurality of visual marks corresponding to data values, of the data field, in the set of rows.

18 Claims, 27 Drawing Sheets

(A)

↓

714 (continued) Receive a first user input on the user interface to define a dynamic set of data values according to: (i) user selection of displayed visual marks in the data visualization region and/or (ii) user specification of one or more user-defined parameters corresponding to data fields in the data source.

> 718 Receiving the first user input to define a dynamic set of data values includes receiving user selection of at least one visual mark of the plurality of first visual marks of the first data visualization.

> 720 In response to receiving the first user input, display an icon, representing the dynamic set, in the schema information region.

> 722 Receiving the first user input to define a dynamic set of data values includes receiving user input in the first data entry field, specifying a first parameter. The first parameter defines a range of data values for the first data field.
>
>> 724 Receiving the first user input to define a dynamic set of data values includes receiving user input in the second data entry field, specifying a second parameter. The second parameter defines a set of data values for the second data field.

↓

726 Receive a second user input to define a calculation that compares data values from one or more data fields from the data source to data values in the dynamic set of data values. The calculation is associated with the first shelf region of the plurality of shelf regions.

> 728 The second user input defines the calculation to compare data values from the first data field to the data values in first elements of the ordered pairs in the dynamic set of data values.
>
>> 730 The second user input defines the calculation to compare data values from the second data field to data values in second elements of the ordered pairs in the dynamic set of data values.

> 732 The second user input specifies (i) the one or more data fields, (ii) an "IN" operator, and (iii) the dynamic set of data values.

734 In response to receiving the second user input, identify a first set of rows from the data source whose data values for the one or more data fields are included in the dynamic set of data values.

736 In response to receiving the second user input, display results of the calculation in the data visualization region.

738 In response to receiving the second user input, generate a calculated data field corresponding to the calculation and displaying the calculated data field in the schema information region.

740 Identifying the first set of rows from the data source includes identifying rows whose data values for the first data field are in the range defined by the first parameter.

742 Identifying the first set of rows from the data source includes identifying rows from the data source that include: (i) data values for the first data field in the range defined by the first parameter and (ii) data values in the second data field in the set of data values defined by the second parameter.

744 Receive a third user input to place a data field from the schema information region into the second shelf region. The data field is distinct from the dynamic set of data values and distinct from the one or more data fields.

746 In response to the third user input, generate and display a data visualization in the data visualization region. The data visualization includes a plurality of visual marks corresponding to data values, of the data field, in the first set of rows.

VISUAL ANALYSIS PLATFORM UTILIZING DYNAMIC GROUP DATA ELEMENTS IN CUSTOM CALCULATIONS

TECHNICAL FIELD

The disclosed implementations relate generally to data visualization and more specifically to systems, methods, and user interfaces that enable users to interact with data visualizations to analyze data.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including custom calculations.

SUMMARY

Analysis of a data source is commonly focused on a subset of data values. A user may be interested in analyzing only data values from the data source that meet predefined criteria, such as analyzing sales data for the top three salespeople in the company. Because the group of top salespeople depends on who has the most sales, the members of the group changes over time. For instance, last week, salespeople A, B, and C may be the people with the highest number of sales, but this week, the top three salespeople may be A, B, and D. Conventionally, a user interested in such information would have to manually determine the members of the set of data values of interest for each analysis that the user wants to perform. Thus, for each analysis that is performed, the user determines which salespeople are the top three at the time of the analysis, generates a static set of data values with the identified members, and uses the static set of data values in any data analysis or calculations. This process requires that the members in the static set be manually redefined each time the analysis is performed. Thus, it is desirable to generate a technical solution that automatically determines the members of a dynamic set of data values in real time so that the members of the dynamic set of data values is determined at each execution of a calculation or analysis, and is automatically updated in accordance with information in the data source in real time.

Some implementations provide a method of generating data visualizations that utilize custom calculations that include dynamic sets of data values (e.g., a dynamic group of data elements) such that the custom calculations are dynamically updated in response to a change in the data values of the dynamic set of data values. A data visualization generated using the custom calculation is also dynamically updated in response to a change in the data values of the dynamic set of data values. For example, a user can generate a dynamic set of data values that are selected from an existing data column. The dynamic set of data values may be defined based on user selection, one or more user-defined parameters, one or more rules, one or more expressions, and/or one or more actions that determine which data values from an existing data column are selected (e.g., automatically selected) for inclusion in the dynamic set of data values. For example, a user may select visual marks in a data visualization so that data values corresponding to the selected visual marks are included in the dynamic set of data values. In another example, a user may define a parameter, value range, or rule that data values in a data column must meet in order to be included in a dynamic set of data values. The data values of the dynamic set of data values are automatically updated (e.g., independently of additional user input) in accordance with a change in data values in the existing data column and in accordance with any changes to selections, rules, expressions, and/or actions that define how data values are selected for inclusion in the dynamic set of data values. Some implementations extend this to dynamic groups of data values that include information from more than one existing data field, such as a dynamic group of ordered pairs of data values (or ordered triples, order quadruples, . . . )

Analysts commonly use data values from data fields in a database to generate calculations and data visualizations. For example, an analyst may be interested in identifying real estate listings that are more expensive than a mean housing price for an area. When generating a calculation or data visualization for such a metric using static data fields or static data sets, the analysis requires user knowledge or user determination to identify the mean housing price and the price of each real estate listing, both of which may dynamically change as new listings are added to the list, newly sold properties are removed from the list, and home owners change their listing price to reflect current market trends. Thus, by implementing methods to automatically identify relevant listings using a dynamic set of data values, perform custom calculations using the dynamic set of data values, and generate data visualizations based on the custom calculations, analysis of information in a database can by dynamically updated in accordance with updates to information (e.g., stored data values) in the database.

Disclosed implementations address the deficiencies and other problems associated with existing data visualization applications, and enable users to generate data visualization from customized calculations that are automatically and dynamically updated in accordance with changes (e.g., updates) to information stored in a database. The changes (e.g., updates) to custom calculations are also propagated to any data visualizations that are generated based on the custom calculation.

In accordance with some implementations, a method executes at an electronic device with a display. For example, the electronic device can be a smart phone, a tablet, a notebook computer, or a desktop computer. The device receives user selection of a data source. In response to receiving the user selection of the data source, the device displays a user interface. The user interface includes a schema information region that includes a plurality of data fields from the data source, a data visualization region that is distinct from the schema information region, and a plurality of shelf regions that are distinct from both the schema information region and the data visualization region. The plurality of shelf regions include a first shelf region and a second shelf region that is distinct from the first shelf region. A first user input at the user interface defines a dynamic set of data values according to: (i) user selection of displayed visual marks in the data visualization region and/or (ii) user specification of one or more user-defined parameters corresponding to data fields in the data source. A second user input defines a calculation to compare data values from one or more data fields from the data source to data values in the dynamic set of data values. The calculation is associated with the first shelf region of the plurality of shelf regions. In response to receiving the second user input, the device identifies (e.g., automatically identifying, independently of additional user input) a first set of rows from the data source whose data values are included in the dynamic set of data values. A third user input places a data field from the data source in the second shelf region of the plurality of shelf regions. The data field is distinct from the dynamic set of data values and distinct from the calculation. In response to the third user input, the device displays (e.g., automatically) a data visualization, which includes displaying a plurality of visual marks corresponding to data values, of the data field, in the first set of rows.

In some instances, prior to receiving the first user input, the device displays a first data visualization in the data visualization region. The first data visualization is distinct from the data visualization, and the first data visualization includes a first plurality of visual marks that correspond to data values from the one or more data fields from the data source. In such cases, receiving the first user input to define a dynamic set of data values includes receiving user selection of at least a visual mark of the plurality of first visual marks at the first data visualization In some instances, prior to receiving the first user input, the device displays a first data entry field in the user interface. The first data entry field is associated with a first data field from the data source. In such cases, receiving the first user input to define a dynamic set of data values includes receiving user input in the first data entry field to specify a first parameter, which specifies a range or set of values for the first data field. The device identifies the first set of rows from the data source whose data values for the first data field are in the range or set defined by the parameter.

In some instances, prior to receiving the first user input, the device displays a second data entry field, distinct from the first data entry field, in the user interface. The second data entry field is associated with a second data field from the data source, and the second data field is distinct from the first data field. In such cases, receiving the first user input to define a dynamic set of data values includes receiving user input in the second data entry field that specifies a second parameter corresponding to the second data field. The second parameter defines a range or set of values for the second data field. The device identifies the first set of rows from the data source whose data values are included in the dynamic set of data values includes identifying rows from the data source that include: (i) data values for the first data field in the range specified by the first parameter and (ii) data values for the second data field in the set of values specified by the second parameter.

In some instances, the device detects detects a change in (e.g., an update to) the dynamic set of data values. In response to detecting the change in the dynamic set of data values, the device identifies (e.g., automatically independently of additional user input) a second set of rows from the data source whose data values are included in the changed dynamic set of data values, and updates (e.g., automatically updating, independently of additional user input) the data visualization so that the plurality of visual marks displayed in the updated data visualization corresponds to data values of the data field that are in the second set of rows.

In some instances, the change in the dynamic set of data values includes inclusion of a new data value in the dynamic set of data values and/or exclusion of an existing data value in the dynamic set of data values.

In some instances, the dynamic set of data values is updated (e.g., automatically updated, independently of additional user input) in response to a change in data values in the one or more data fields from the data source and/or a fourth user input to redefine the dynamic set of data values according to: (i) a new user selection of displayed visual marks in the data visualization region and/or (ii) a new user specification of the one or more user-defined parameters corresponding to data fields in the data source.

In some instances, the device detects a change in (e.g., an update to) one or more data values of the data field. The one or more data values are associated with the first set of rows. In response to detecting the change in the one or more data values in the data field, the device updates (e.g., automatically updating, independently of additional user input) the data visualization so that the plurality of visual marks displayed in the updated data visualization corresponds to the changed one or more data values in the data field that are associated with the first set of rows.

In some implementations, in response to receiving the second user input, the device displays (e.g., automatically displaying, independently of additional user input) results of the calculation (e.g., results of the comparison) in the data visualization region.

In some implementations, in response to receiving the second user input, the device generates (e.g., automatically generating, independently of additional user input) a calculated data field corresponding to the calculation and displaying the calculated data field in the schema information region.

In some implementations, in response to receiving the first user input, the device displays (e.g., automatically displays) an icon, representing the dynamic set of data values, in the schema information region.

In some instances, the dynamic set of data values is a set of ordered pairs of data values for a first data field and a second data field. The second user input defines the calculation to compare data values from the first data field to the data values in the first elements of the set of ordered pairs.

In some instances, the second user input further defines the calculation to compare data values from a second data field from the data source to data values in second elements of the ordered pairs in the dynamic set.

In some implementations, the second user input includes: (i) the one or more data fields, (ii) the "IN" operator, and (iii) the dynamic set of data values.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer readable storage medium stores one or more programs configured for execution by a computing device having one or more processors, memory, and a display. The one or more programs include instructions for performing any of the methods described herein.

Thus methods, systems, and graphical user interfaces are disclosed that enable users to generate data visualizations from calculations that utilize dynamic sets of data values.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 7A-7D illustrate a flowchart of a method for generating data visualizations, in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
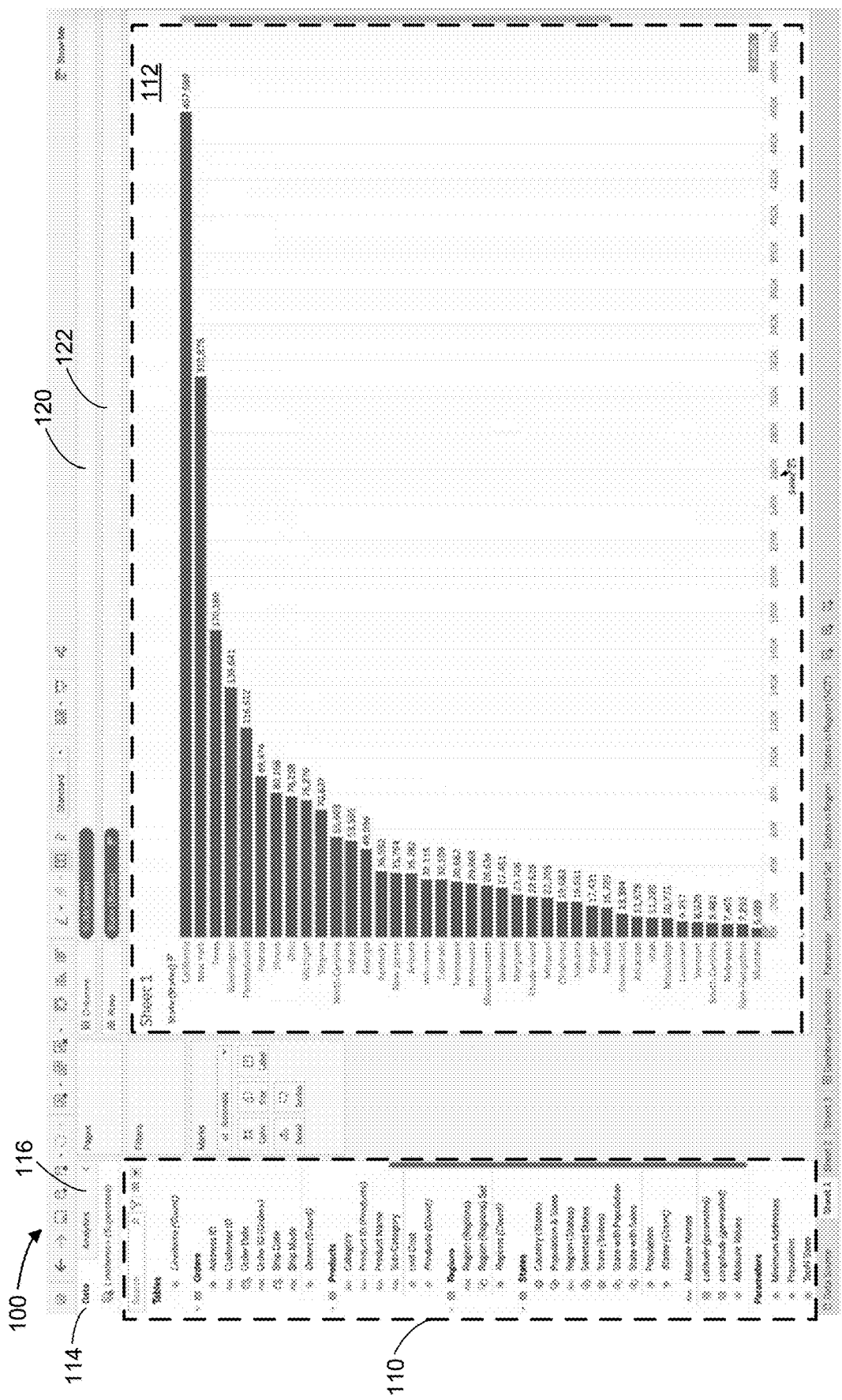
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., data field names) that may be selected and used to build a data visualization. In some implementations, the list of data field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements.

The graphical user interface 100 also includes a data visualization region 112. As illustrated here, the data visualization region 112 has a large space for displaying a visual graphic (e.g., a data visualization), such as a bar chart. In some implementations, the data visualization region 112 has multiple layers that are referred to as sheets.

The graphical user interface 100 also includes a plurality of shelf regions, such as a columns shelf region 120 and a rows shelf region 122. These are also referred to as the column shelf 120 and the row shelf 122. Data fields (e.g., icons corresponding to data fields) can be placed (e.g., via user gesture, such as drag and drop or user selection) in any shelf region of the plurality of shelf regions. Additionally, a user may directly input functions and/or data fields in any shelf region of the plurality of shelf regions. In some implementations, the graphical user interface automatically places a data field (e.g., a data field icon corresponding to a data field) in a shelf region of the plurality of shelf region in response to a user action.

Figure 2A:
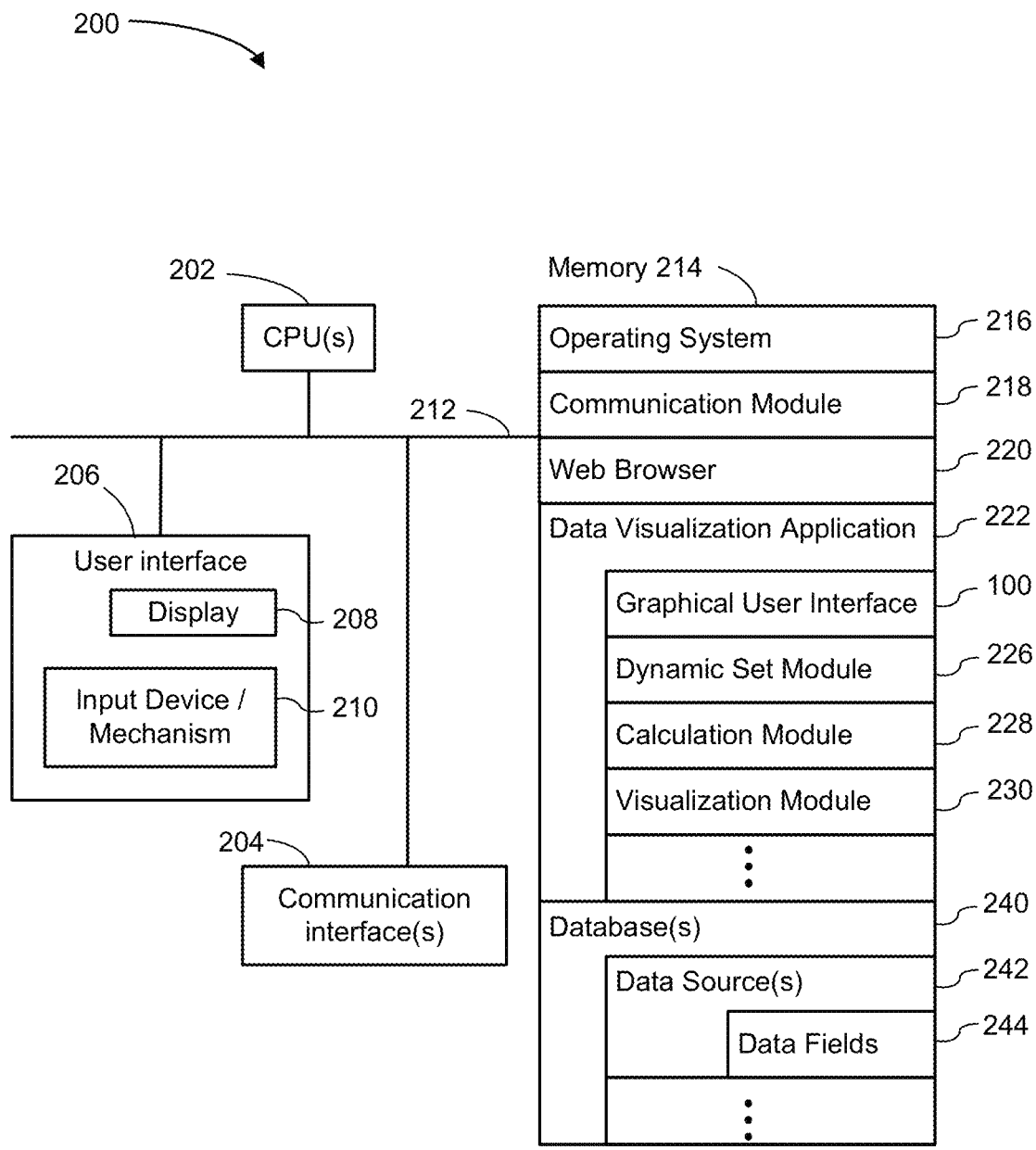
FIG. 2A is a block diagram of a computing device according to some implementations.

FIG. 2A is a block diagram of a computing device 200 (e.g., a client device) that can execute a data visualization application 222 or a data visualization web application to display a data visualization. In some implementations, the computing device displays a graphical user interface 100 for the data visualization application. The computing device 200 includes desktop computers, laptop computers, tablet computers, and other computing devices with a display and a processor capable of running a data visualization application 222. The data visualization application 222 may include a data source generator for database organization (e.g., generating object models for databases) as well as generating new data sources using existing databases. A computing device 200 typically includes one or more processing units/cores (CPUs) 202 for executing modules, programs, and/or instructions stored in the memory 214 and thereby performing processing operations, one or more network or other communications interfaces 204, memory 214, and one or more communication buses 212 for interconnecting these components. The communication buses 212 may include circuitry that interconnects and controls communications between system components. A computing device 200 includes a user interface 206 comprising a display 208 and one or more input devices or mechanisms 210. In some implementations, the input device/mechanism includes a keyboard; in some implementations, the input device/mechanism includes a "soft" keyboard, which is displayed as needed on the display 208, enabling a user to "press keys" that appear on the display 208. In some implementations, the display 208 and input device/mechanism 210 comprise a touch screen display (also called a touch sensitive display). In some implementations, the display is an integrated part of the computing device 200. In some implementations, the display is a separate display device.

In some implementations, the memory 214 includes high-speed random-access memory, such as DRAM, SRAM, DDR RAM or other random-access solid-state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPUs 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- a data visualization application 222, which provides a graphical user interface 100 for a user to construct visual graphics (e.g., an individual data visualization or a dashboard with a plurality of related data visualizations). In some implementations, the data visualization application 222 executes as a standalone application (e.g., a desktop application). In some implementations, the data visualization application 222 executes within the web browser 220 (e.g., as a web application). The data visualization application 222 includes: a graphical user interface 100, which enables a user to build data visualizations by specifying elements visually, and provides a graphical view to access or build object models and data sources; a dynamic set module 226, which generates dynamic sets of data values in accordance with user selection or user-defined parameters; a calculation module 228, which generates calculations that utilize information stored in data fields; and a data visualization module 230, which generates a visual specification that generates and displays data visualization on a display device; and zero or more databases 240 that store one or more data sources 242. Each data source includes one or more data fields 244 (e.g., data column), and each data field 244 includes one or more data values that can be used for analysis, including for generating dynamic sets of data values, performing calculations, and in data visualizations.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

Figure 2B:
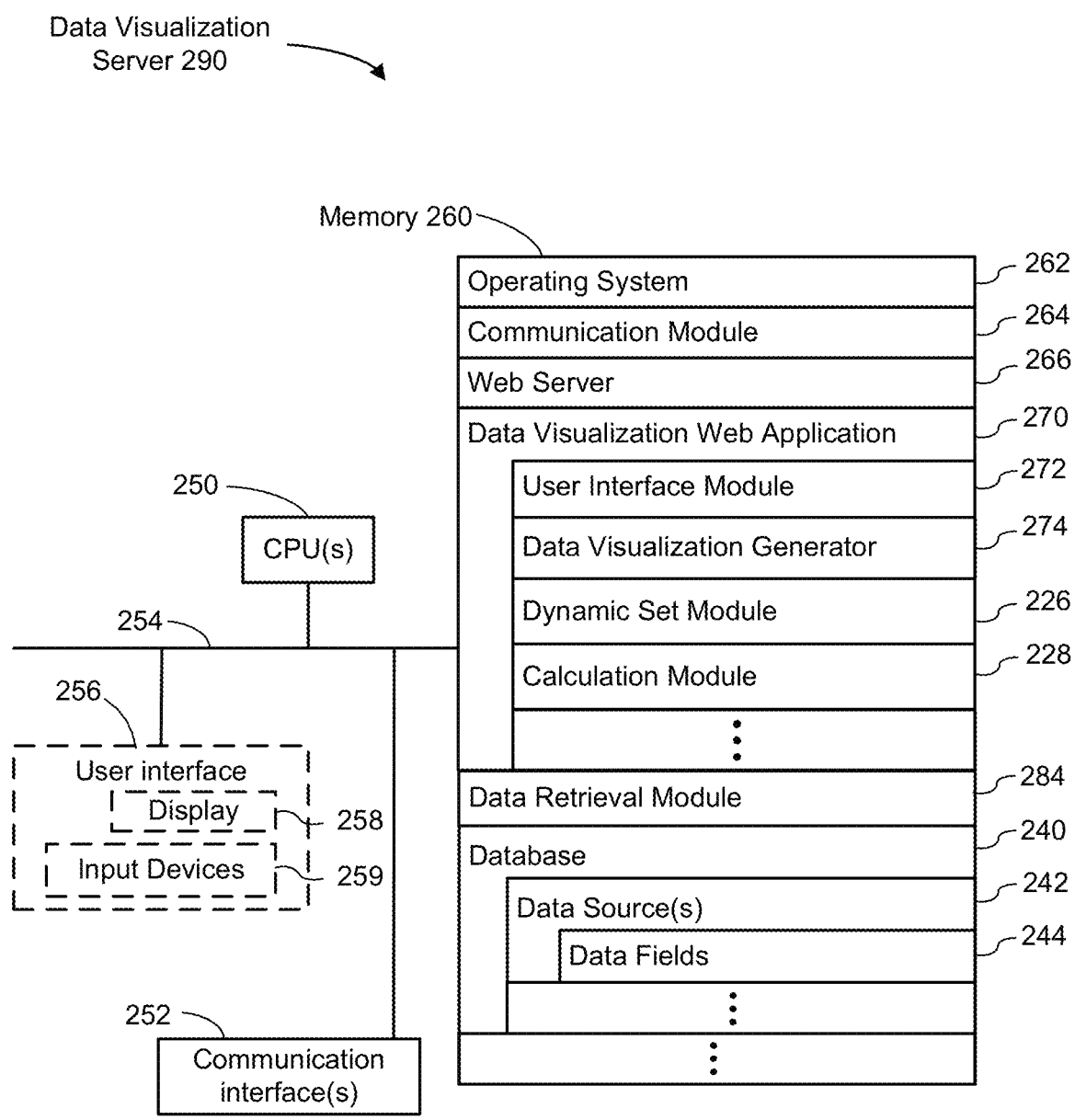
FIG. 2B is a block diagram of a server system according to some implementations.

FIG. 2B is a block diagram of a data visualization server 290 (e.g., server system) in accordance with some implementations. A data visualization server 290 may host one or more databases 240 or may provide various executable applications or modules. A server 290 typically includes one or more processing units/cores (CPUs) 250, one or more network interfaces 252, memory 260, and one or more communication buses 254 for interconnecting these components. In some implementations, the server 290 includes a user interface 256, which includes a display 258 and one or more input devices 259, such as a keyboard and a mouse. In some implementations, the communication buses 254 include circuitry (sometimes called a chipset) that interconnects and controls communications between system components.

In some implementations, the memory 260 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 260 includes one or more storage devices remotely located from the CPU(s) 250. The memory 260, or alternatively the non-volatile memory devices within the memory 260, comprise a non-transitory computer readable storage medium.

In some implementations, the memory 260, or the computer readable storage medium of the memory 260, stores the following programs, modules, and data structures, or a subset thereof:

an operating system 262, which includes procedures for handling various basic system services and for performing hardware dependent tasks;

a network communication module 264, which is used for connecting the server 290 to other computers via the one or more communication network interfaces 252 (wired or wireless) and one or more communication networks, such as the Internet, other wide area networks, local area networks, metropolitan area networks, and so on;

a web server 266 (such as an HTTP server), which receives web requests from users and responds by providing responsive web pages or other resources;

a data visualization web application 270, which may be downloaded and executed by a web browser 220 on a user's computing device 200. In general, a data visualization web application 270 has the same functionality as a desktop data visualization application 222, but provides the flexibility of access from any device at any location with network connectivity, and does not require installation and maintenance. In some implementations, the data visualization web application 270 includes various software modules to perform certain tasks. In some implementations, the data visualization web application 270 includes a user interface module 272, which provides the user interface for all aspects of the data visualization web application 270;

in some implementations, the data visualization web application includes a data visualization generator 274, which generates and displays data visualizations according to user-selected data sources and data fields. The data visualization generator 274 generates data visualizations based on visual specifications, which define the characteristics of the data visualization to be displayed, including the characteristics of the visual marks in the data visualization;

in some implementations, the data visualization web application also includes a dynamic set module 226 and a calculation module 228, each of which is described above for a computing device 200;

a data retrieval module 284, which builds and executes queries to retrieve data from one or more databases 240. The databases 240 may be stored locally on the server 290 or stored at an external database system. For example, the data retrieval module 284 may retrieve a data source 242 from the database 240 in response to a user selection of the data source 242; and one or more databases 240, which store data used or created by the data visualization web application 270 or data visualization application 222. The databases 240 may store one or more data sources 242, which provide the data used in the generated data visualizations. Each data source 242 includes one or more data fields 244 (also referred to as "columns" or "data columns"), and each data field 244 includes one or more data values. In some implementations, the database 240 stores user preferences. In some implementations, the database 240 includes a data visualization history log. In some implementations, the data visualization history log tracks each time the data visualization web application 270 or data visualization application 222 renders a data visualization.

The databases 240 may store data in many different formats, and commonly includes many distinct tables, each with a plurality of data fields 244. Some databases 240 comprise a single table.

The data fields 244 in the database 240 include both raw fields from the database 240 (e.g., a column from a database table or a column from a spreadsheet) as well as derived data fields, which may be computed or constructed from one or more other data fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 244 are stored separately from the data source 242. In some implementations, the database 240 stores a set of user preferences for each user. The user preferences may be used when the data visualization web application 270 (or desktop data visualization application 222) makes recommendations about how to view a set of data fields 244. In some implementations, the database 240 stores a data visualization history log, which stores information about each data visualization generated.

In some implementations, the database 240 stores other information, including information used by the data visualization application 222 or data visualization web application 270. The databases 240 may be separate from the data visualization server 290, or may be included with the data visualization server (or both).

In some implementations, the data visualization history log stores visual specifications generated by user interaction with the data visualization user interface 100. The visual specification may include a user identifier, a timestamp of when the data visualization was created, a list of the data fields used in the data visualization, the type of the data visualization (sometimes referred to as a "visualization type," "view type" or a "chart type"), data encodings (e.g., color, size, and shape of marks), and the data relationships selected. In some implementations, one or more thumbnail images of each data visualization are also stored. Some implementations store additional information about created data visualizations, such as the name and location of the data source 242, the number of rows from the data source that were included in the data visualization, the version of the data visualization software, and so on.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 260 stores a subset of the modules and data structures identified above. In some implementations, the memory 260 stores additional modules or data structures not described above.

Although FIG. 2B shows a data visualization server 290, FIG. 2B is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 290 may be stored or executed on a computing device 200. In some implementations, the functionality and/or data may be allocated between a computing device 200 and one or more servers 290. Furthermore, one of skill in the art recognizes that FIG. 2B need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically collocated (e.g., the individual physical devices could be spread throughout the United States or throughout the world).

Figure 3:
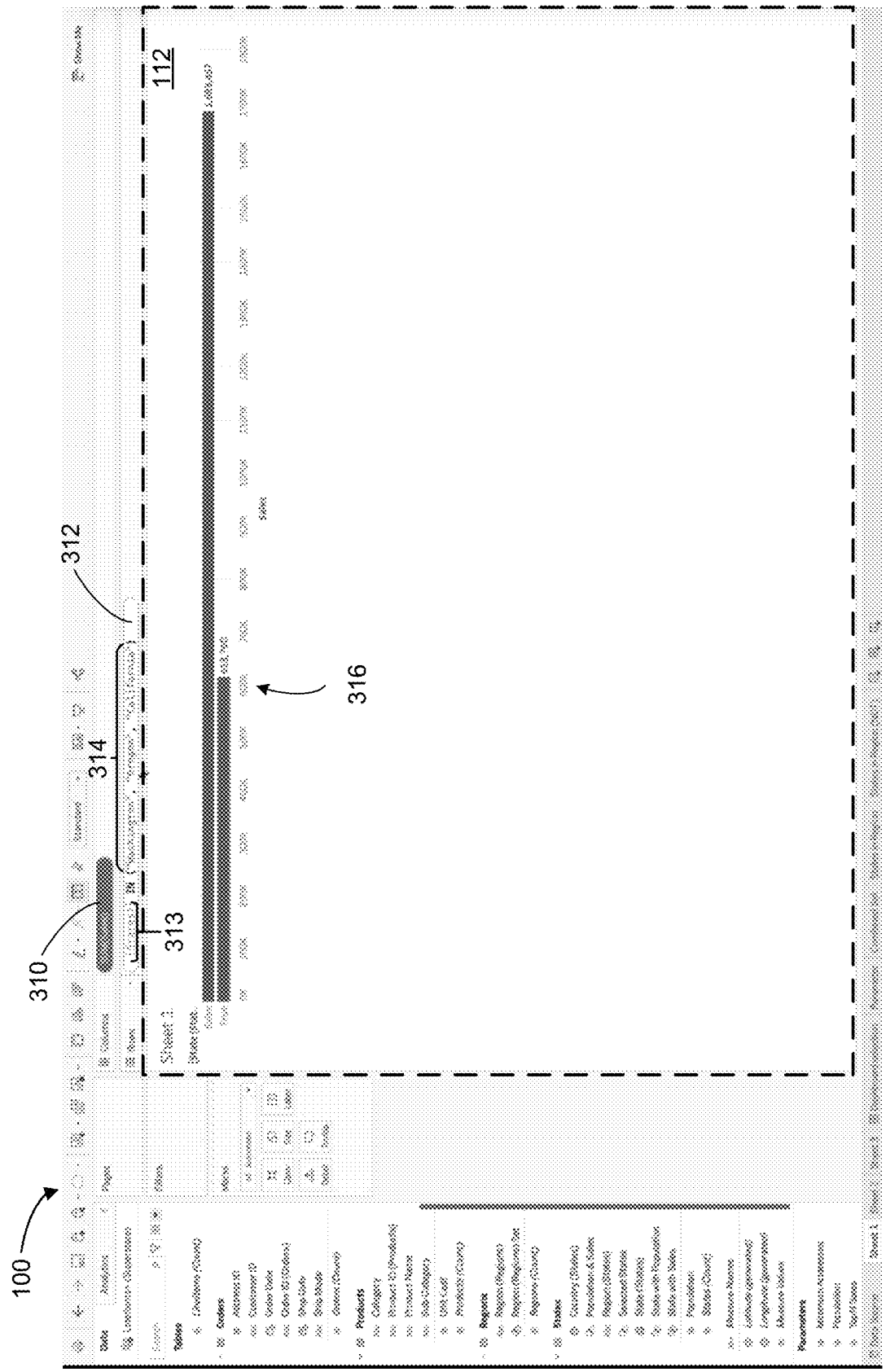
FIG. 3 illustrates generating a calculation using a static set of data values, in accordance with some implementations.

FIG. 3 illustrates generating a calculation using a static set of data values, in accordance with some implementations. The graphical user interface 100 displays a data visualization (e.g., bar chart) in the data visualization region 112. The graphical user interface 100 also shows that a "SUM(Sales)" data field 310 (e.g., a data field icon representing the "SUM(Sales)" data field) is associated with the columns shelf region 120, and a calculation 312 is associated with the rows shelf region 122. The calculation 312 identifies a static set of data values 314 (i.e., "Washington", "Oregon," California"), an operator (i.e., "IN"), and a data column 313 (i.e., the "States" data field) within the data source (e.g., "LineItems+Superstore"). The calculation 312 requests a comparison between data values in the static set of data values 314 to data values in the "States" column 313. Based on placement of the "SUM(Sales)" data field 310 in the columns shelf region 120 and placement of the calculation 312 in the rows shelf region 122, the graphical user interface 100 displays a data visualization 316 in the data visualization region 112. In this example, the data visualization shows a total amount of sales (e.g., sum of sales) for states from the static set of data values 314 (labeled "True"), and a total amount of sales for other states, (labeled as "False"). As shown, the total sales for states from the static set of data values 314 (i.e., "Washington", "Oregon," and "California"), is $613,760, and the total sales for states that are not part of the static set of data values 314 (e.g., all States in the "States" data column except for "Washington", "Oregon," and "California") is $1,683,457.

While the operations described above with respect to FIG. 3 can be useful in data analysis, such operations can be expanded to be more dynamic and responsive to user interactivity with visual marks in the data visualization or to adjustable user-defined parameters. FIGS. 4A-4K, 5A-5D, and 6A-6D illustrate examples of the use of dynamic sets of data values, instead of the static set of data values shown in FIG. 3. The following figures also show how the dynamic set of data values can be defined and updated in response to user action (e.g., user input or user selection) at the graphical user interface 100.

FIGS. 4A-4K illustrate generating data visualizations from a dynamic set of data values selected from a data visualization, in accordance with some implementations.

Figure 4A:
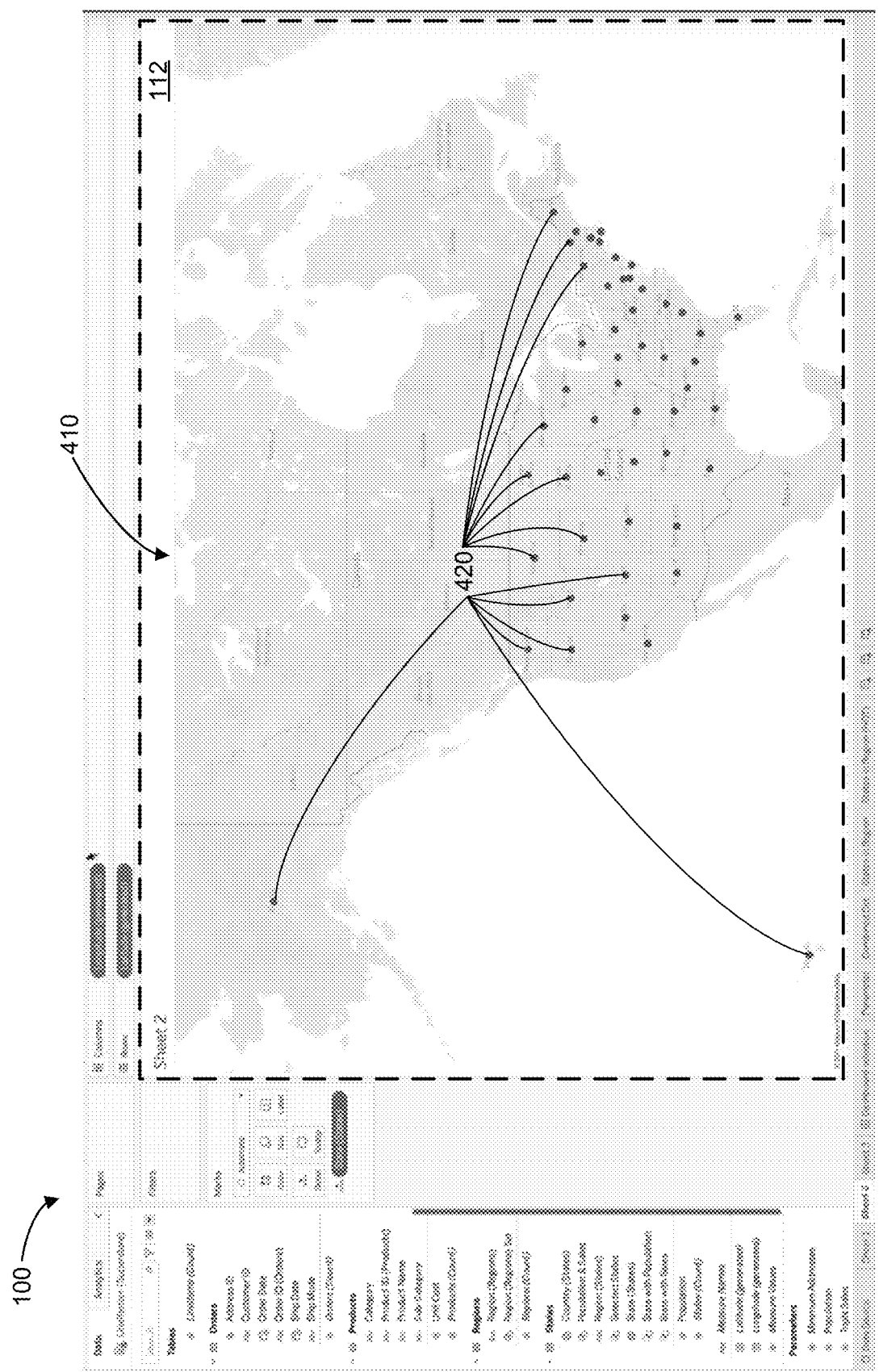
FIGS. 4A-4K illustrate generating data visualizations from a dynamic set of data values selected from a data visualization, in accordance with some implementations.

In FIG. 4A, the graphical user interface 100 displays a data visualization 410 that has a map visualization type. The data visualization 410 has a map of North America and includes a plurality of visual marks 420 (shown as circles) corresponding to states in the United States of America. Each visual mark of the plurality of visual marks 420 is individually selectable (e.g., selectable independently of other visual marks of the plurality of visual marks 420). For example, a first visual mark corresponding to the state of California is independently selectable from a second visual mark corresponding to the state of Oregon.

Figure 4B:
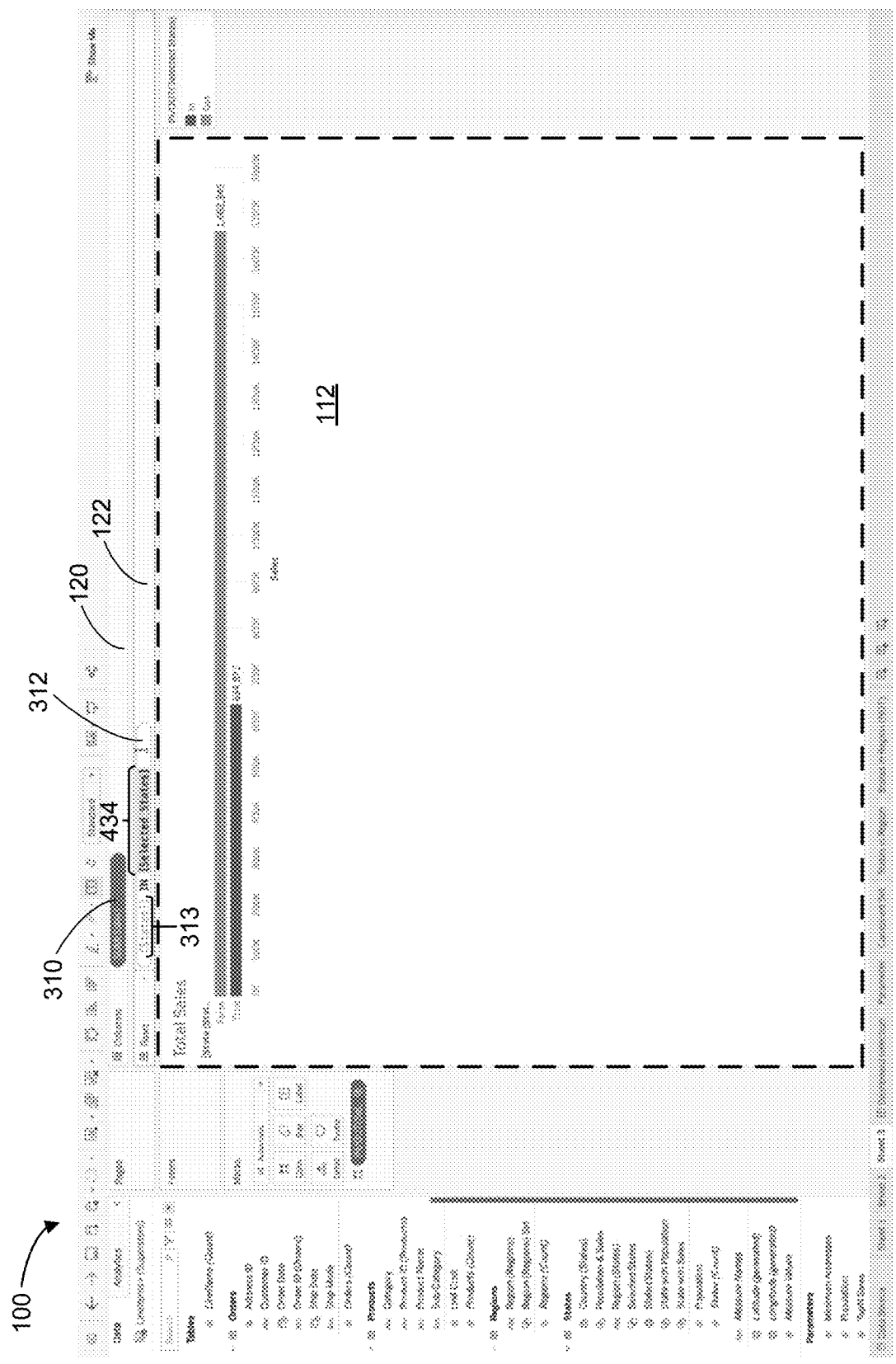

In FIG. 4B, the calculation 312 (previously described with respect to FIG. 3) is updated by a user to include a dynamic set of data values 434 (e.g., "Selected States") that corresponds to states that are selected via the data visualization 410 shown in FIG. 4A. The updated calculation 312 identifies the "Selected States" dynamic set of data values 434, an operator ("IN"), and a data column 313 (the data field, "States") within the data source (e.g., "LineItems+Superstore"). The updated calculation 312 compares data values in the dynamic set of data values 434 to data values in the "States" column 312 (e.g., the "States" data field). In this example, the data visualization shown in data visualization region 112 is not yet updated since the user is in process of editing the calculation 312.

Figure 4C:
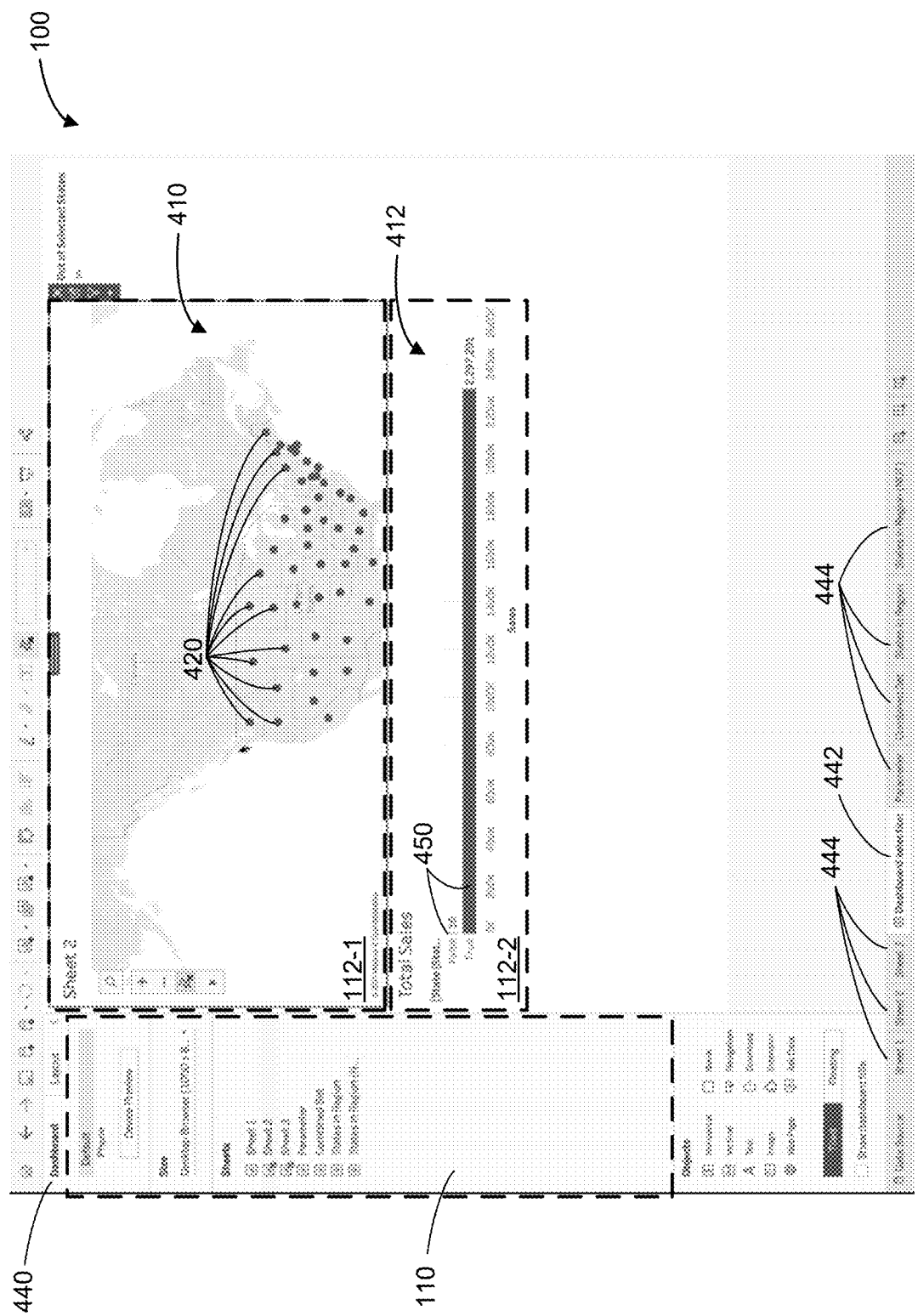

FIG. 4C illustrates a dashboard view of the graphical user interface 100. A user can navigate to a dashboard view by selecting a dashboard tab 440 or by selecting the "dashboard selection" sheet 442. The user can navigate back to a data view (as shown in FIG. 1) by selecting the Data tab 114 (also shown in FIG. 1) or navigate to other sheets (e.g., data sheet, visualization sheet, etc.) in the project (e.g., workspace, workbook) by selecting the desired sheet (e.g., selecting any of the icons 444, each corresponding to different sheets).

In the dashboard view, the schema information region 110 displays sheets (e.g., worksheets) that have been created for the project (e.g., created in the workbook or workspace), and the graphical user interface 100 may include one or more data visualization regions. For instance, as shown in FIG. 4C, the graphical user interface 100 includes a first data visualization region 112-1 that displays a first data visualization 410, and a second data visualization region 112-2 that displays a second data visualization 412, which is distinct and separate from the first data visualization 410. In this example, the data visualization 410 has a first visualization type (a map visualization type), and the second data visualization 412 has a second visualization type (a bar chart visualization type). In some implementations, the first data visualization 410 and the second data visualization 412 are related to one another. In this example, the data visualization 410 is a map that includes a plurality of visual marks 420 corresponding to states in the United States of America, and the data visualization 412 is a bar chart that includes a plurality of visual marks 450 corresponding to total sales, categorized based on whether or not the sales amount is from a state that is selected in the first data visualization 410.

In response to receiving the user input to update the calculation 312 to include the "Selected States" dynamic set of data values 434, the data visualization 412 is updated in accordance with user selections (if any) at the data visualization 410. In this example, the user has selected visual marks corresponding to all continental states (e.g., all states except Alaska and Hawaii). In response to the user selection, the selected states are added to (e.g., included in) the "Selected States" dynamic set of data values 434, and the data visualization 412 is updated to display the total sales from the selected states (e.g., total sales from states that are included in the "Selected States" dynamic set of data values 434) using the "True" label, and to display total sales from states other than the selected states (e.g. total sales from states that are not included in the "Selected States" dynamic set of data values 434) using the "False" label. In this example, the total sales in the selected states is $2,297,201 and the total sales in states other than the selected states (e.g., in states that are not selected) is $16.

Figure 4D:
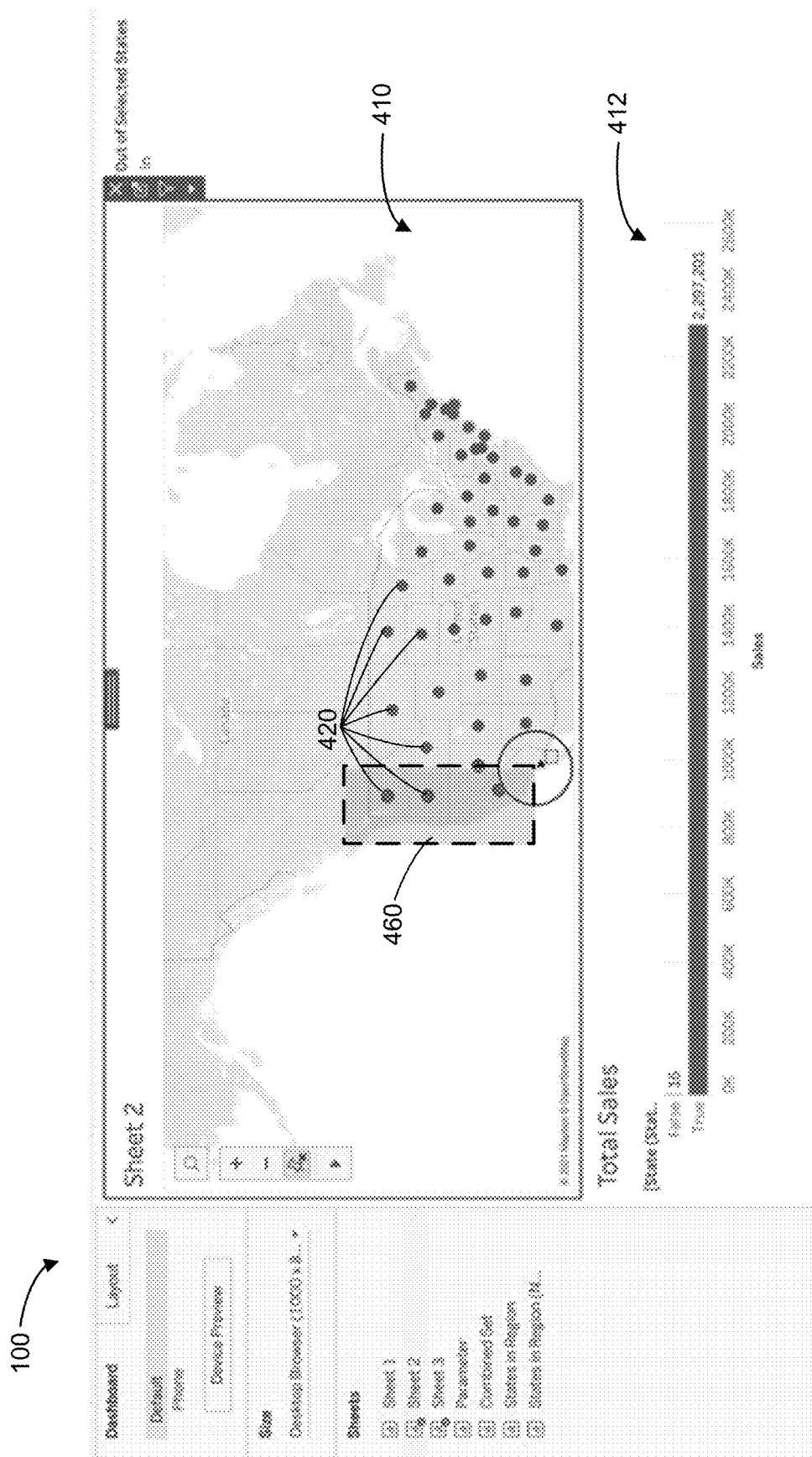

FIG. 4D illustrates a user input 460 to select a subset of visual marks from the plurality of visual marks 420 for inclusion in the "Selected States" dynamic set of data values 434. In this example, the user input 460 is a user gesture to drag a box over the subset of visual marks to select the subset of visual marks. Alternatively, the user input 460 may include one or more user clicks (e.g., a single click, a double click, or a right click at each visual mark to indicate selection). In yet another example, a user input 460 includes a combination of user inputs that indicate a selection, such as a series of clicks to select multiple visual marks while holding down the shift key on a keyboard.

Figure 4E:
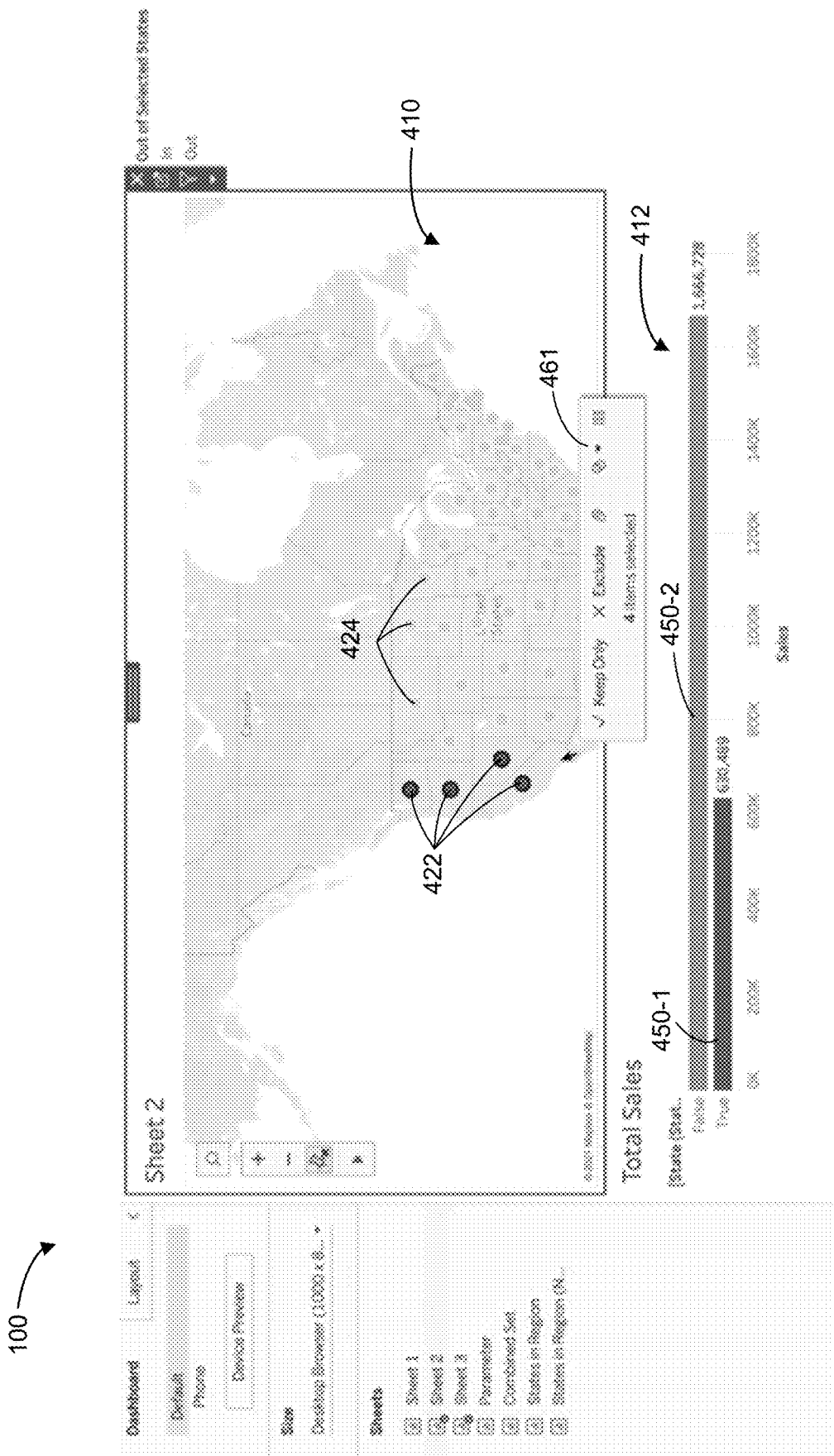

In FIG. 4E, the graphical user interface 100 displays the selected subset of visual marks 422 such that they are visually distinguishable from the visual marks 424 of the plurality of visual marks 420 that are not selected (the selected visual marks 422 are visually emphasized relative to visual marks 424 that are not selected). In response to the user input 460 (shown in FIG. 4D) to select visual marks 422 for inclusion in the "Selected States" dynamic set of data values 434, the data visualization 412 is updated to reflect the change in data values in the dynamic set of data values 434 based on the user selection of the visual marks 422 in the data visualization 410. In this example, the dynamic set of data values 434 is automatically updated (independently of additional user input) to include only data values corresponding to the selected visual marks 422 from the data visualization 410. In response to the change in the dynamic set of data values 434, the visual mark 450-1 in the data visualization 412 is automatically updated (independently of additional user input) to show that the total sales in states that are included in the "Selected States" dynamic set of data values 434 (selected states) is $630,489, and visual mark 450-2 is automatically updated (independently of additional user input) to show that the total sales in states that are not included in the "Selected States" dynamic set of data values 434 (states other than the selected states) is $1,666,728.

Additionally, in response to a user gesture (e.g., hover, click, right click, double click) at the data visualization 410, the graphical user interface 100 displays information regarding the data visualization 410, including information regarding any selected visual marks. In this example, the information regarding the data visualization 410 is displayed in a pop-up window 461.

Figure 4F:
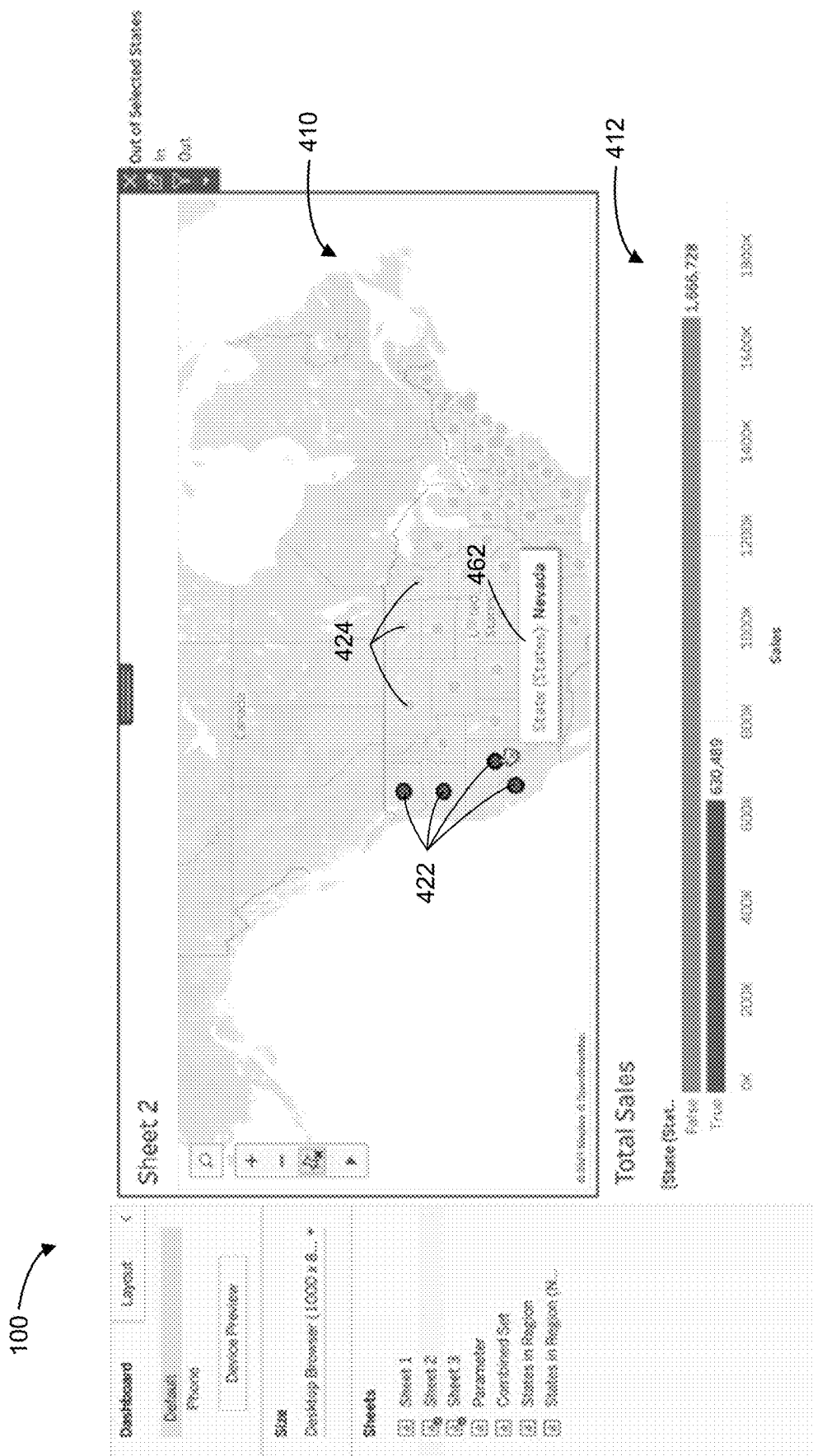

In FIG. 4F, in response to a user gesture (e.g., hover, click, right click, double click) at a visual mark of the plurality of visual marks 422, the graphical user interface 100 displays information regarding the visual mark. In this example, the information regarding the visual mark includes the name of the state to which the visual mark corresponds ("Nevada"), and the data field from which the data represented by the visual mark is obtained (the "State(States)" data field). In this example, the information regarding the visual mark is displayed in a pop-up window 462.

Figure 4G:
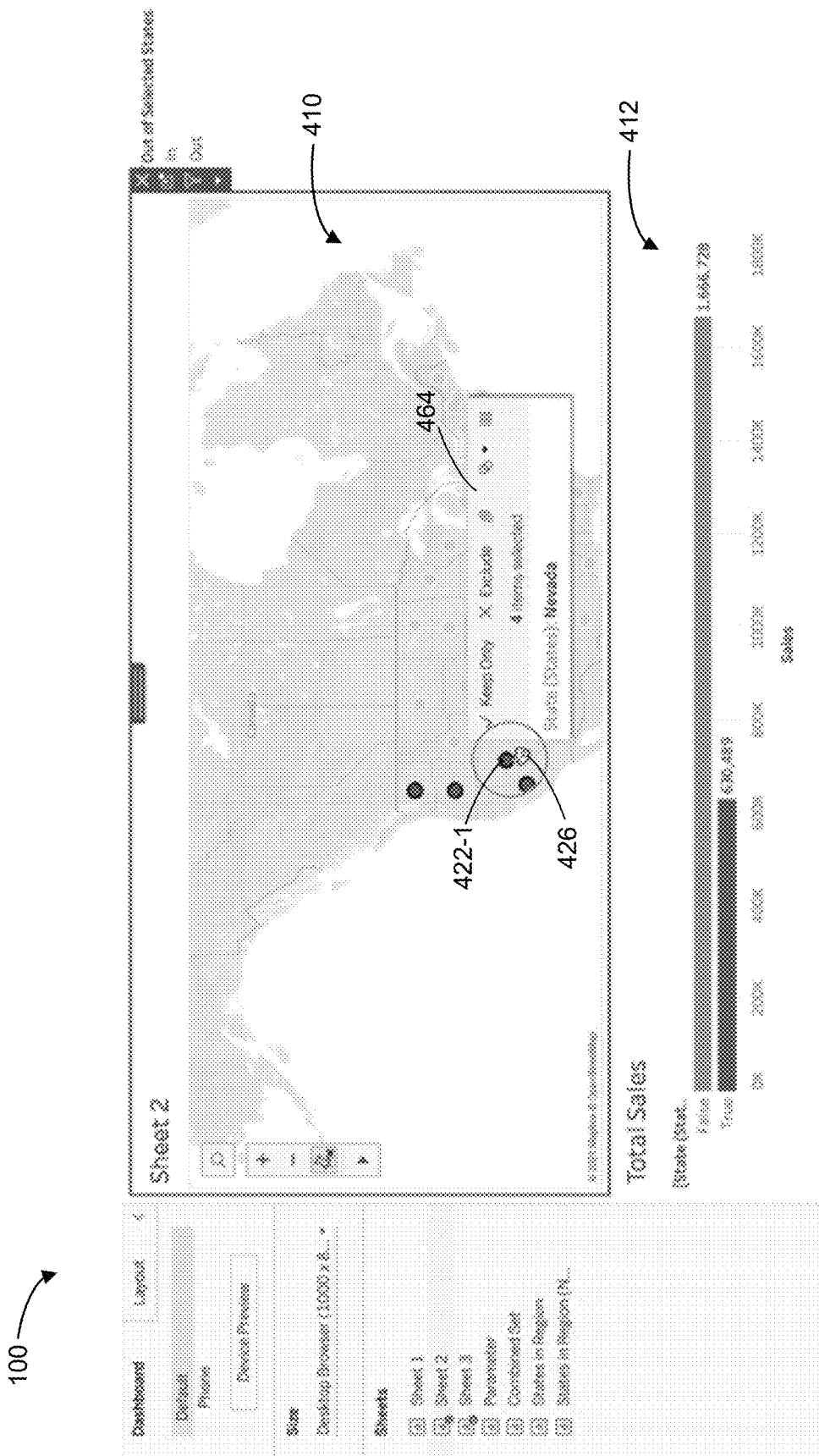

FIG. 4G illustrates a user input 426 to deselect a visual mark 422-1 via the data visualization 410, thereby removing the data value corresponding to the visual mark 422-1 from the dynamic set of data values 434 (i.e., removing "Nevada" from the "Selected States" dynamic set of data values 434, shown in FIG. 4B). The user input 426 may include one or more user clicks (e.g., a single click, a double click, or a right click at each visual mark to indicate deselection). In yet another example, a user input 460 may include a combination of user inputs that indicate a selection, such as a series of clicks to deselect multiple visual marks while holding down the shift key on a keyboard. In yet another example, a user may drag a box around one or more visual marks that are currently selected to deselect the one or more visual marks. The popup window 464 shows information about both (i) the four selected visual marks and (ii) tooltip data about the visual mark where the cursor is located (i.e., Nevada).

Figure 4H:
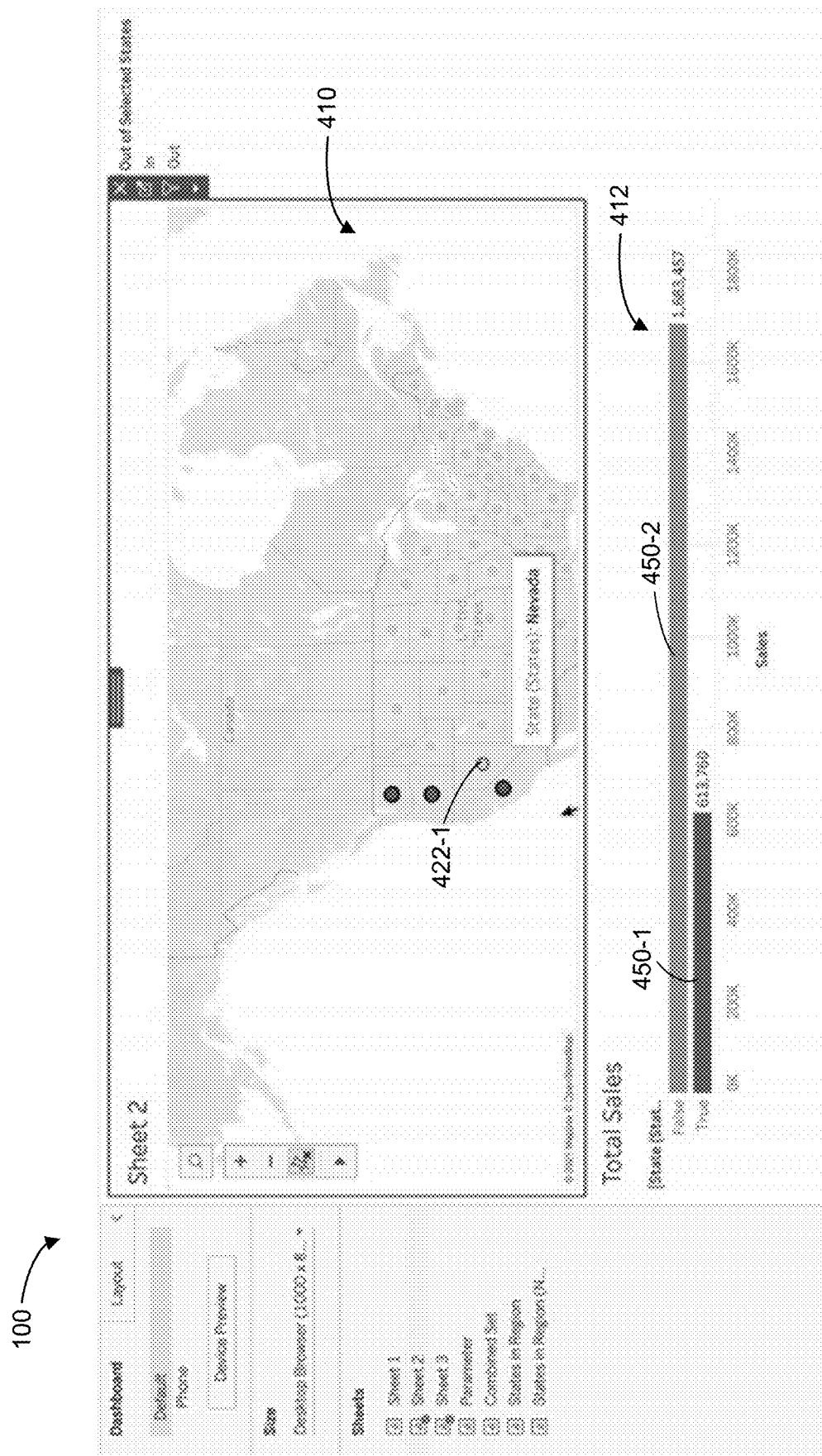

In FIG. 4H, in response to the user input 426 to deselect the visual mark 422-1 corresponding to the state of Nevada, the "Selected States" dynamic set of data values 434 is automatically updated (independently of additional user input) to exclude "Nevada," and in response to the updated dynamic set of data values 434 (in response to the removal of "Nevada" from the "Selected States" dynamic set of data values 434), the data visualization 412 is updated so that the visual mark 450-1 displays a total amount of sales for the states that are included in the "Selected States" dynamic set of data values 434 (which in this example, includes California, Oregon, and Washington), and the visual mark 450-1 displays a total amount of sales for the states that are not included in the "Selected States" dynamic set of data values 434. Compared to the data visualization 412 shown in FIG. 4E, which illustrates the total sales while the state of Nevada was included in the dynamic set of data values 434, the values corresponding to the visual marks 450-1 and 450-2 are changed to reflect the exclusion of the state of Nevada from the "Selected States" dynamic set of data values 434. For example, the size of the visual mark 450-1 is changed (reduced) and the label corresponding to the visual mark 450-1 is changed from $630,489 (in FIG. 4E) to $613,760, and the size of the visual mark 450-2 is changed (increased) and the label corresponding to the visual mark 450-2 is changed from $1,666,728 (in FIG. 4E) to $1,683,457

Figure 4I:
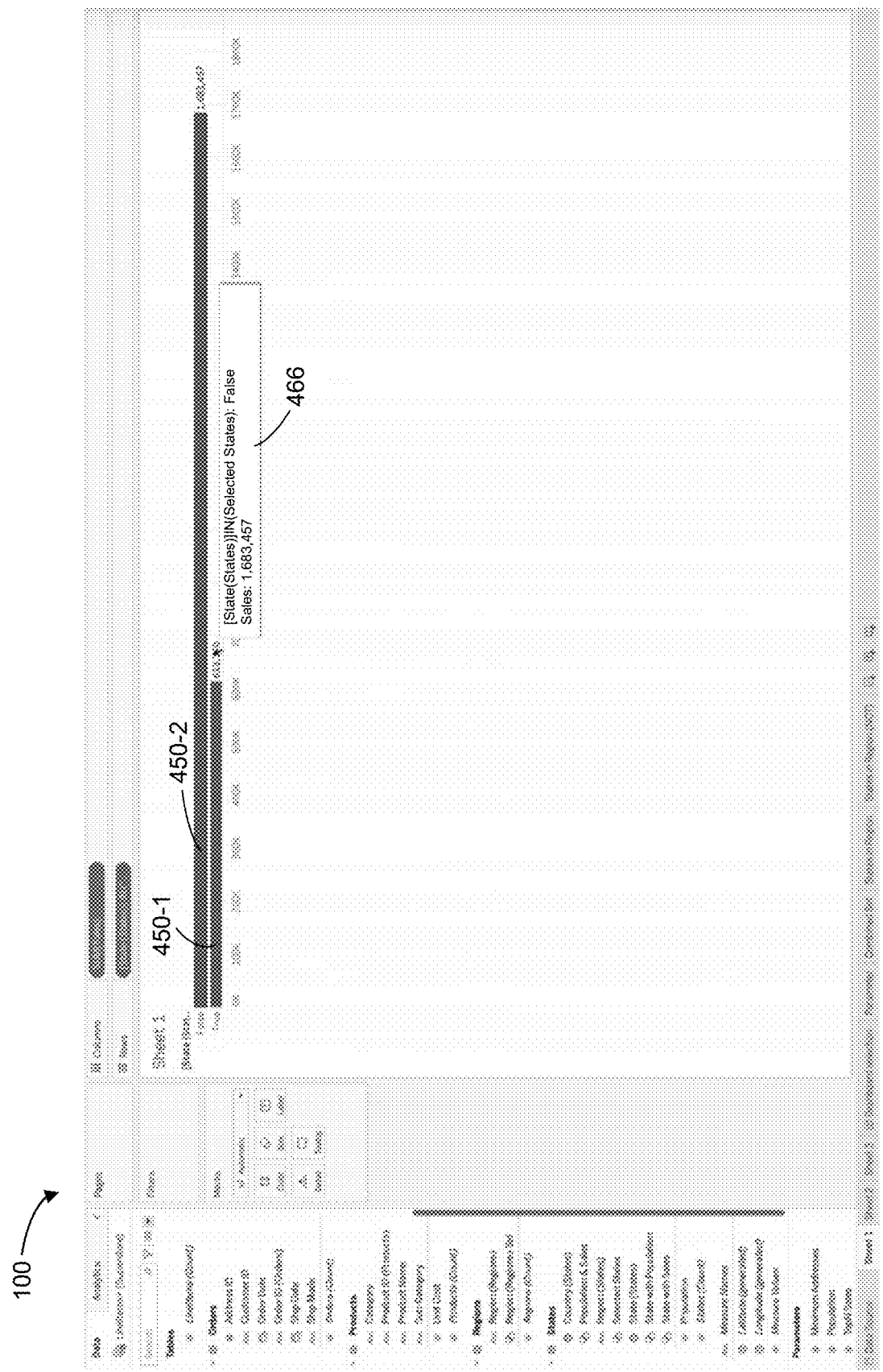

In FIG. 4I, the graphical user interface 100 displays the data visualization 412 in the data visualization region 112 in a data view (e.g., a user interface view in accordance with the Data tab 114 or in a user interface view for sheet 1, which includes a data visualization region 112). Changes to the data visualization 412 as shown in the dashboard view (e.g., shown in FIG. 4H) are propagated throughout the entire workspace (project or workbook), including to the data visualization 412 shown in the "sheet 1" in a data view.

Additionally, in response to a user gesture (e.g., hover, click, right click, double click) at a visual mark of the data visualization 412, the graphical user interface 100 displays information regarding the visual mark. In this example, in response to a user gesture at the visual mark 450-2, the graphical user interface 100 displays the information regarding the visual mark 450-2, including displaying the calculation 312, the calculation result corresponding to visual mark 450-2 (e.g., "False," which indicates that the data value represented by visual mark 450-2 correspond to data values that do not satisfy the condition required by the calculation 312), and the data value corresponding to the visual mark 450-2 ("1,683,457"). In this example, the information regarding the visual mark 450-2 is displayed in a pop-up window 466.

Figure 4J:
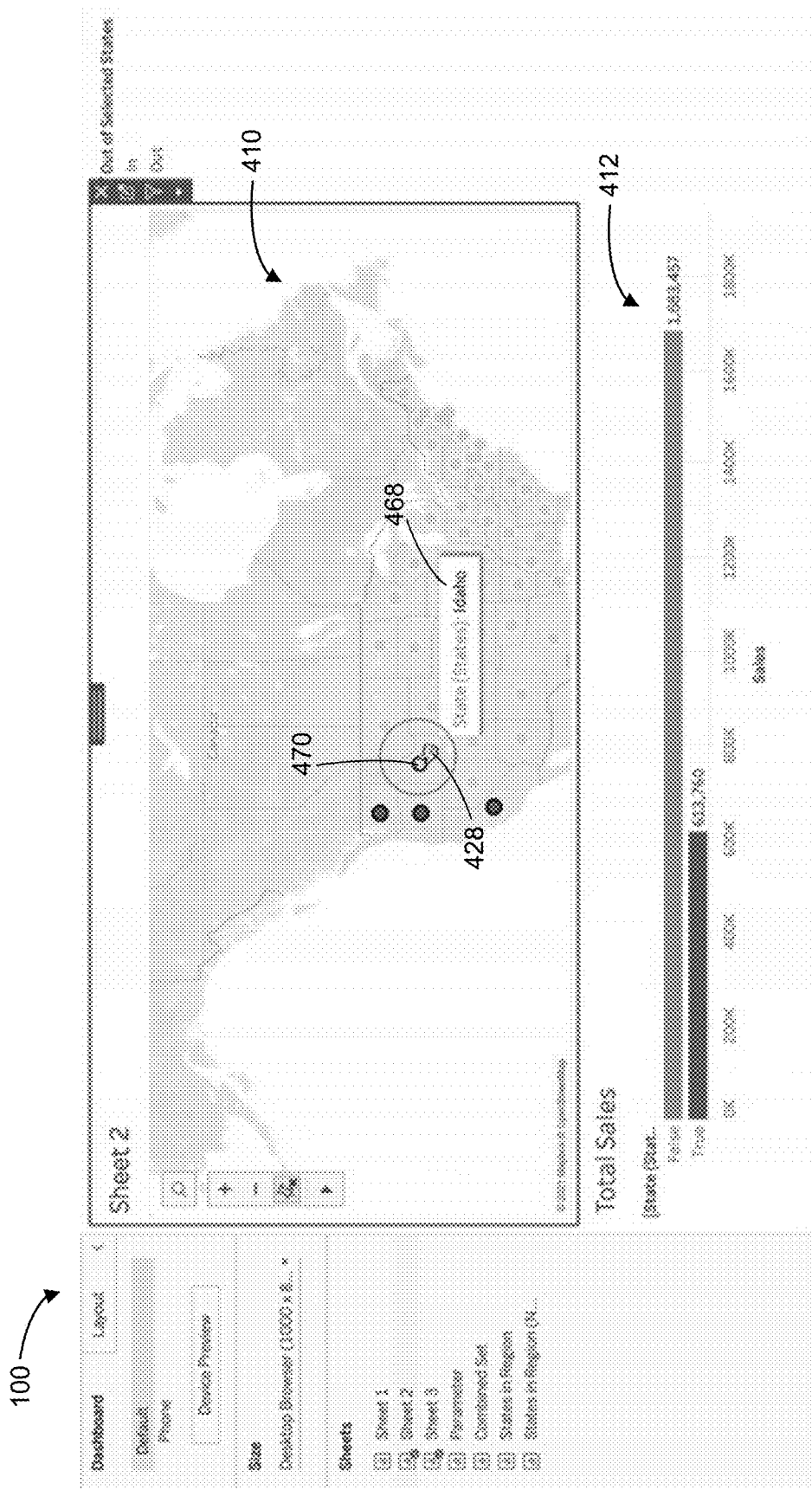

FIG. 4J illustrates a user input 428 to add a data value corresponding to a visual mark 470 from the data visualization 410 to the dynamic set of data values 434. The user input 428 may include one or more user clicks (e.g., a single click, a double click, or a right click at the visual mark 470 to indicate selection). In response to a user gesture at the visual mark 470, the graphical user interface 100 displays information regarding the visual mark 470. Note that the user gesture may be distinct from the user input 428, such as a cursor hover before clicking. In this example, the information regarding the visual mark 470 includes the name of the state that the visual mark 470 corresponds to ("Idaho"), and the data field from which the data represented by the visual mark is obtained ("State(States)"). In this example, the information regarding the visual mark 470 is displayed in a pop-up window 468. In this example, the dynamic set of data values 434 and the data visualization 412 are not yet updated as the user is in process of selecting the visual mark 470.

Figure 4K:
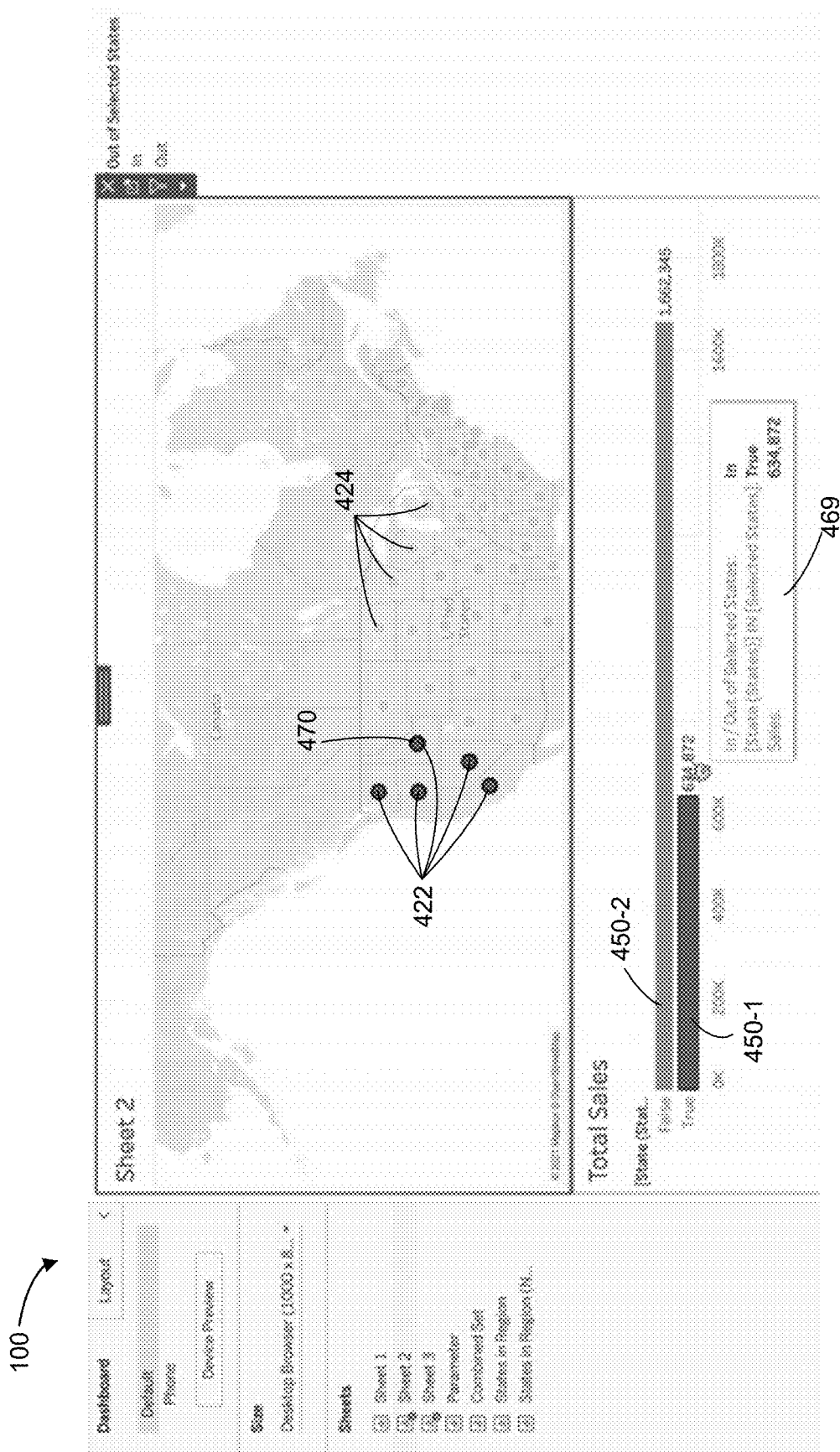

In FIG. 4K, in response to the user input 428 to select the visual mark 470 at the data visualization 410, the data value corresponding to visual mark 470 (e.g., the data value, "Idaho") is added to the dynamic set of data values 434, and the graphical user interface 100 displays the selected subset of visual marks 422, including visual mark 470) such that they are visually distinguishable from the visual marks 424 of the plurality of visual marks 420 that are not selected (e.g., selected visual marks 422 are visually emphasized relative to visual marks 424 that are not selected). The user has also re-added the state of Nevada to the dynamic set of data values 434.

In response to the addition of new data values (e.g., data values corresponding to the state of Idaho and Nevada) to the dynamic set of data values 434 (e.g., via user selection of corresponding visual marks in the data visualization 410), the data visualization 412 is updated to reflect the change in the dynamic set of data values 434. In this example, visual mark 450-1 in the data visualization 412 is updated to show that the total sales in states that are included in the dynamic set of data values 434 is $634,872, and visual mark 450-2 is updated to show that the total sales in states that are not included in the dynamic set of data values 434 (states other than the selected states) is $1,622,345.

Additionally, in response to detection of a user gesture (e.g., hover, pre-selection, selection, click, double click, right click) at a visual mark of the data visualization 412, the graphical user interface 100 displays information regarding the visual mark. In this example, in response to detecting a user gesture at the visual mark 450-1, the graphical user interface 100 displays the information regarding the visual mark 450-1, including visually identifying (e.g., visually distinguishing) which visual marks in data visualization 410 the visual mark 450-2 corresponds to (e.g., the subset of visual marks 422 that are selected and corresponding to the "In" group in the data visualization 410), the calculation 312, the calculation result corresponding to visual mark 450-1 (e.g., "True," which indicates that the data value represented by visual mark 450-1 corresponds to data values that satisfy the condition required by the calculation 312), and the data value corresponding to the visual mark 450-1 (e.g., "634,872"). In this example, the information regarding the visual mark 450-1 is displayed in a pop-up window 469.

As shown in FIGS. 4A-4K, a dynamic set of data values (such as dynamic set of data values 434) can be defined via user selection (and user deselection) of visual marks at a data visualization. This feature allows users to interact with data via the data visualization and does not require that a user to know the full extent of the data values in the data source, or even be aware of the underlying relationships between the data values stored in the data source. As shown, the dynamic set of data values and any calculations that utilize the dynamic set of data values are automatically updated in accordance with data values in the dynamic data field (which are defined based on user selection (and deselection) of data marks corresponding to specific data values).

Additionally, a data visualization that utilizes information from the dynamic set of data values or utilizes a calculation based on the dynamic set of data values is automatically updated in response to changes in the dynamic set of data values. Further, data visualizations can be generated to show information related to the dynamic set of data values. For example, the data visualization 412 shown in FIGS. 4B-4K illustrate information regarding sales totals, but utilizes the dynamic set of data values to determine how to display the sales information. In these examples, a user is able to create a data visualization that provides information that meets the user's needs without having to know exactly how the information regarding states and sales are related to one another in the data source.

A dynamic set of data values can also be defined and updated using other methods beyond user selection at a data visualization. FIGS. 5A-5D and 6A-6D describe using user-defined parameters to define a dynamic set of data values.

FIGS. 5A-5D illustrate generating data visualizations from a dynamic set of data values selected based on a user-defined parameter, in accordance with some implementations.

Figure 5A:
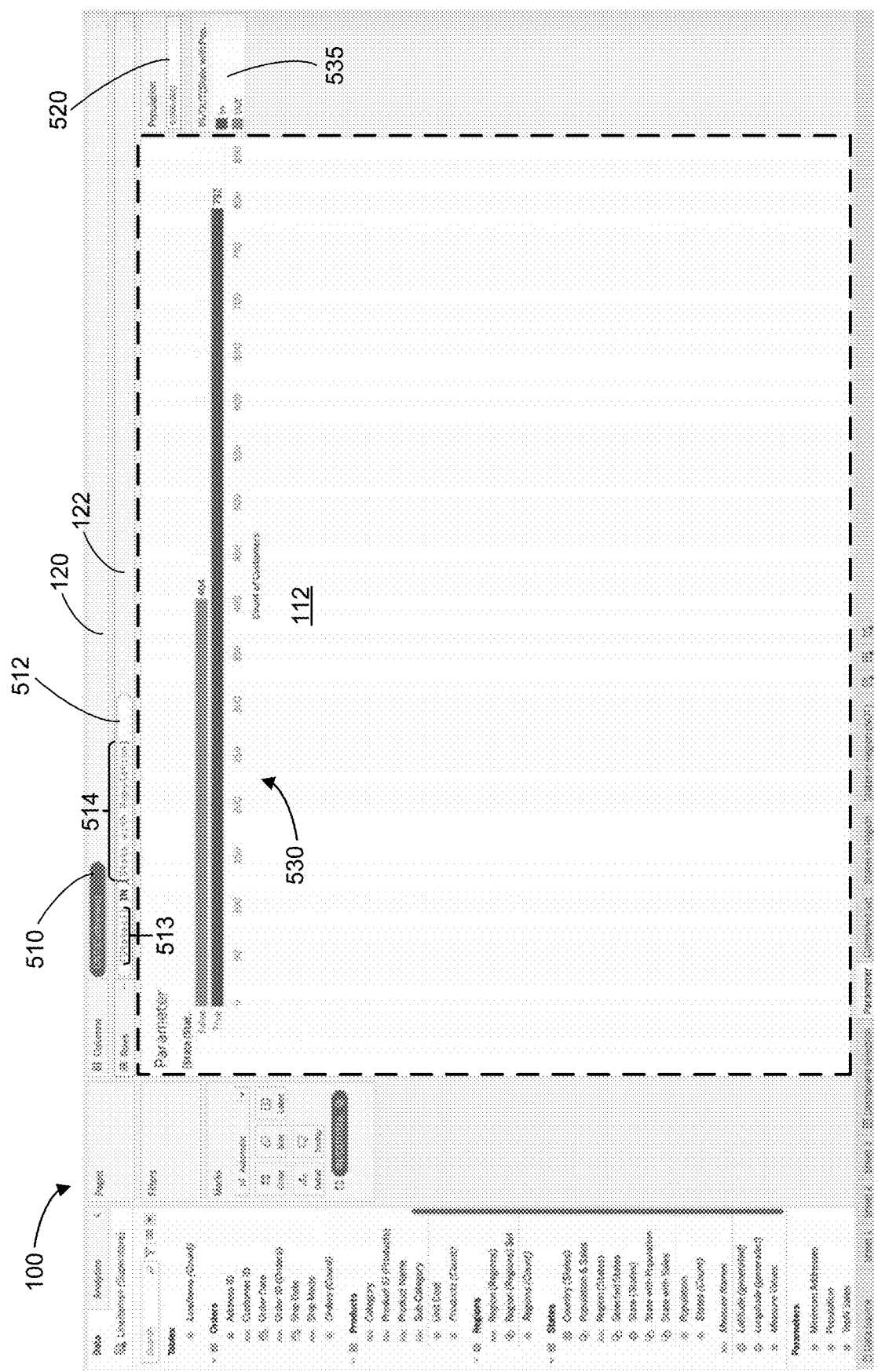
FIGS. 5A-5D illustrate generating data visualizations from a dynamic set of data values selected based on a user-defined parameter, in accordance with some implementations.

FIG. 5A illustrates a data field 510 (a data field icon) corresponding to the count of customers, placed in the columns shelf region 120, and a calculation 512 placed in the rows shelf region 122. The calculation includes a dynamic set of data values 514 ("State with Population", an operator ("IN"), and a data field 513 ("States"). The calculation 512 generates a comparison between data values in the dynamic set of data values 514 to data values in the "States" data field 513. The graphical user interface 100 also displays a data entry field 520 that allows a user to input a user-defined value for a parameter. In this example, the data entry field 520 corresponds to state population and allows the user to input a value that defines a threshold state population value that is used to automatically determine which states are included in the dynamic set of data values 514. In this example, the user has input a threshold value of 5,000,000, thereby defining the dynamic set of data values 514 to include states that have a population of 5,000,000 people or more.

In response to detecting the association of the "CNT (Customers)" data field 510 with the columns shelf region 120 and the association of the calculation 512 with the rows shelf region 122, the graphical user interface 100 generates and displays a data visualization 530 in the data visualization region 112, which illustrates the total customer count for states that are included in the dynamic set of data values 514 (e.g., states that have a population of at least 5,000,000 people) labeled as "True" (also color encoded to correspond with being "In" the dynamic set of data values 514 according to a legend 535 of the data visualization 530), and a the total customer count for states that are not included in the dynamic set of data values 514 (e.g., states that have a population that is less than 5,000,000 people) labeled as "False".

In this example, the data visualization shows a total number of customers (e.g., sum of customers) for states from the dynamic set of data values 514 that are found in the "States" column under the label "True," and a total number of customers for states in the "States" column that are not included in the dynamic set of data values 514 under the label "False." As shown, the total number of customers is 792 in states that are included in the dynamic set of data values 514, and the total number of customers is 404 in states that are not part of the dynamic set of data values 514.

Figure 5B:
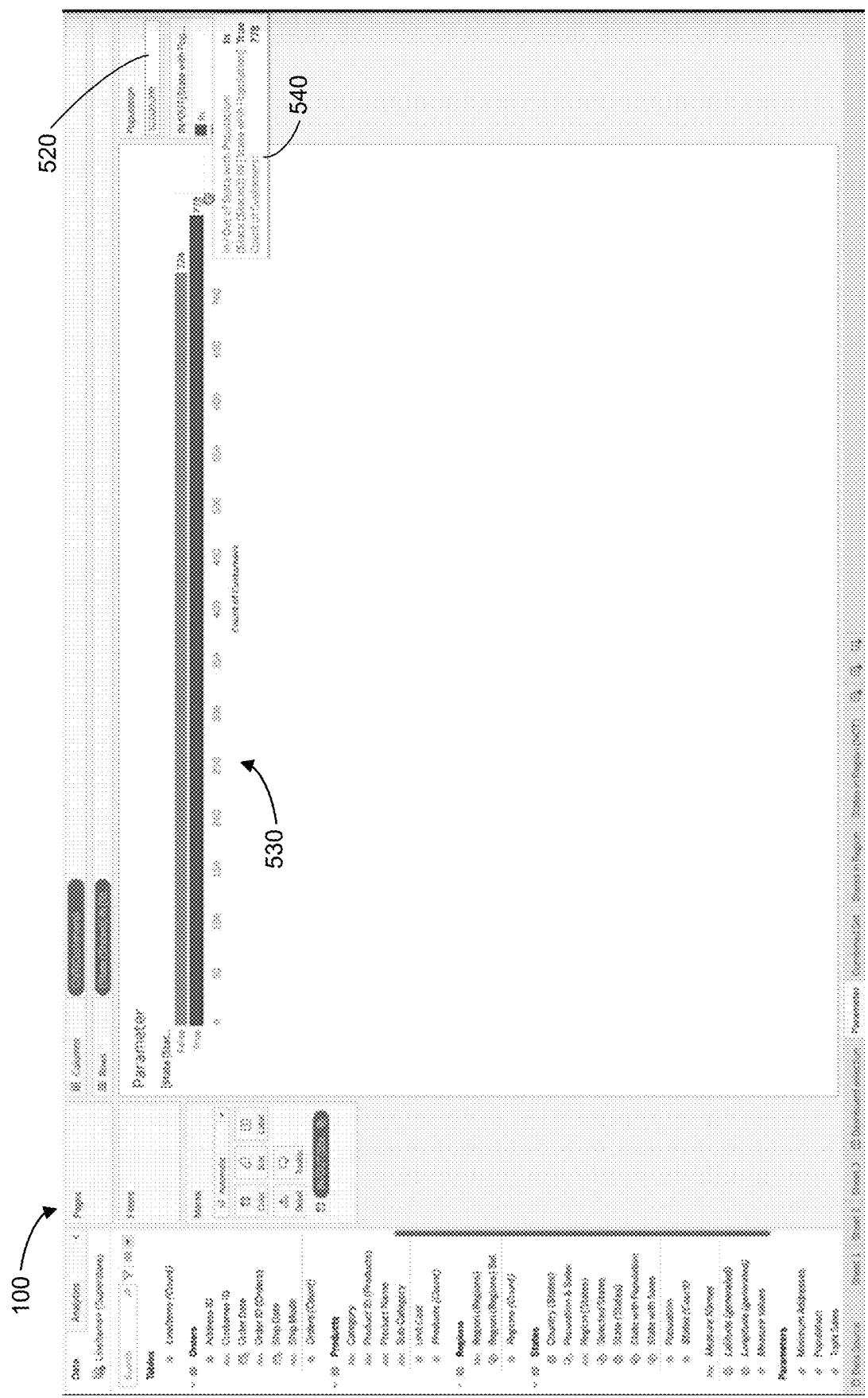

In FIG. 5B, a user has provided a new input in the data entry field 520 to change the threshold value from 5,000,000 to 10,000,000. In response to the change in the threshold value input at data entry field 520, the dynamic set of data values 514 is automatically changed to include only states that have a population of 10,000,000 people or more (e.g., the dynamic set of data values 514 is automatically updated in accordance with the new threshold value provided at data entry field 520). For example, as shown in FIG. 5B, in response to a change in the dynamic set of data values 514 (based on the change in the threshold value input at data entry field 520), the data visualization 530 is updated to reflect the change in the dynamic set of data values 514. In this example, the data visualization 530 is updated to show that the total number of customers is 778 for states that are included in the dynamic set of data values 514 and the total number of customers is 724 for states that are not included in the dynamic set of data values 514. (Due to some undisplayed configuration parameters in the prototype, the data for the count of customers in states with population over 10,000,000 is overstated here.) The tooltip 540 provides information about the data mark near the cursor.

Figure 5C:
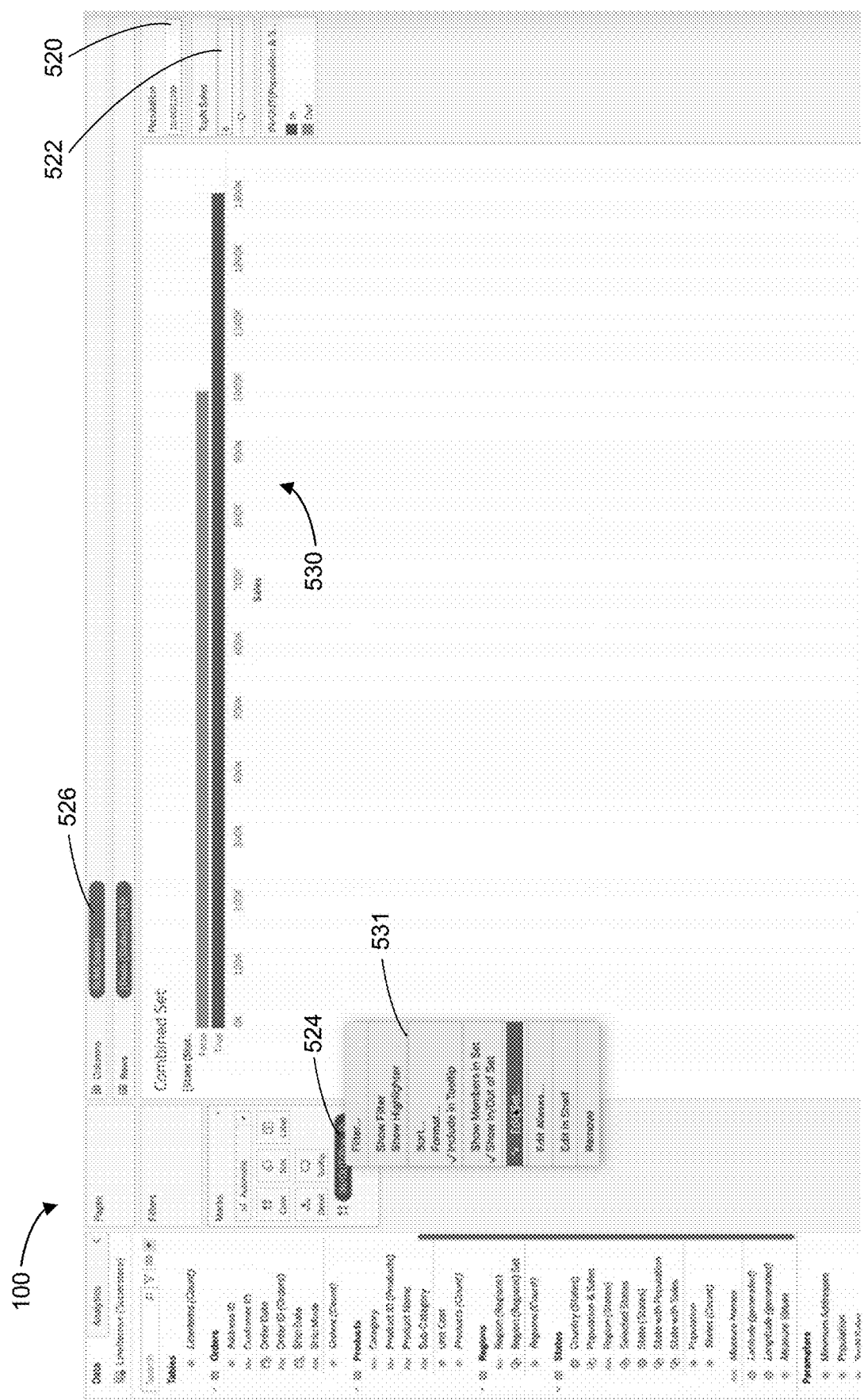

In FIG. 5C, the graphical user interface 100 displays a user interface affordance 522 for defining a threshold value corresponding to another parameter. When the affordance 522 is displayed simultaneously with the data entry field 520, the parameter associated with the affordance 522 is different from the parameter associated with the data entry field 520. In this example, the user entry field 520 is associated with state population (e.g., "Population"), and the user affordance 522 is associated with sales (e.g., "TopN Sales") corresponding to the data field 526 on the column shelf 120. By simultaneously displaying both the data entry field 520 and the affordance 522, a user can define a dynamic set of data values based on a plurality of user-defined parameters. In this example, a user can define the dynamic set of data values 514 based on two parameters: state population and top sales. Additionally, each of the parameters can be defined independently of one another (e.g., a user can define a threshold value in the data entry field 520 independently of user input in the affordance 522, and vice versa).

In response to receiving a user input in the data entry field 520, a first dynamic set of data values 670 is automatically generated (e.g., a dynamic set of data values 670 called "State with Population"), and in response to receiving user input in the affordance 522, a second dynamic set of data values 672 is automatically generated (e.g., a dynamic set of data values 672 called "State with Sales"). The first dynamic set of data values 670 (e.g., "State with Population") includes data values that meet a user-defined parameter (e.g., user-defined criteria) in accordance with the user input in the data entry field 520. In this example, the first set of data values (e.g., "State with Population") includes states that have a population of at least 10,000,000 people. The second dynamic set of data values 672 (e.g., "State with Sales") includes data values that meet a user-defined parameter in accordance with the user input in the affordance 522. In this example, the second dynamic set of data values 672 ("State with Sales") includes states that have the top 8 sales.

A user can define how the two dynamic sets are combined. In response to a user input at an icon 524, a list of options is provided. In this example, the options are provided in a window 531, which may be a pop-up window or a drop down menu window. As shown, one of the options in the list of options is an "Edit Set" option, which allows a user to define how the first and second dynamic sets of data values 670 and 672 are combined. The first dynamic set of data values 670 and the second dynamic set of data values 672 distinct from one another.

Figure 5D:
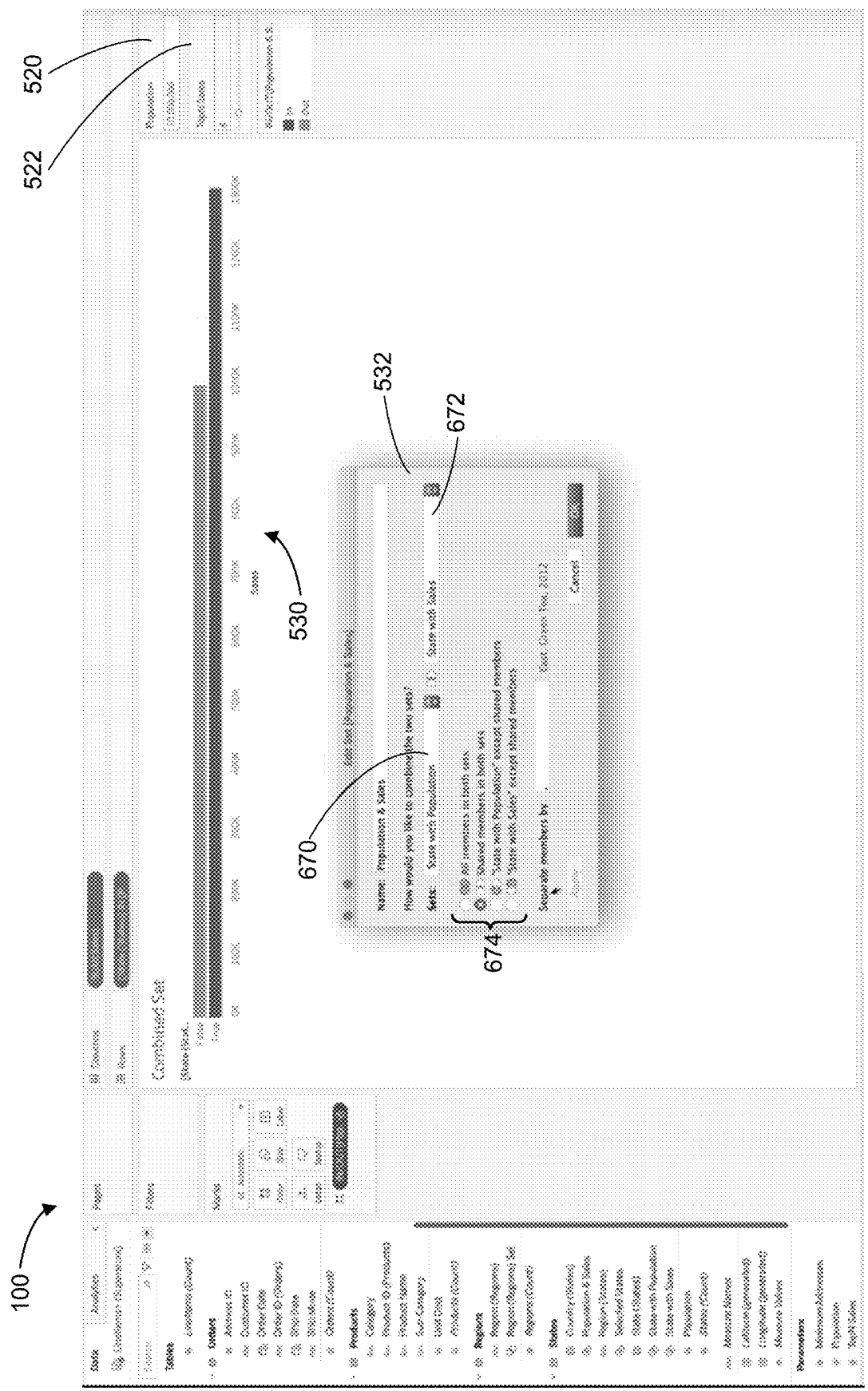

Referring to FIG. 5D, in response to a user selection of the "Edit Set" option from the window 531 (shown in FIG. 5C), the graphical user interface 100 displays a window 532 (e.g., a pop-up window 532) that allows a user to define how the two sets based on "population" and "sales" are combined. The window allows the user to choose from a plurality of operations that determine how the first and second dynamic sets of data values 670 and 672, "State with Population" and "State with Sales," are used to form the combined dynamic set. For example, the user can form a dynamic set of data values that includes all members from both sets of data values, only shared members between both sets of data values, or all members of one of the two sets of data values that excludes any members that are shared between the two sets of data values. These options 674 for combining dynamic sets correspond to the set operations of UNION, INTERSECTION, and DIFFERENCE known in set theory.

By providing the data entry field 520 and/or user affordance 522 as a means for a user to provide and edit user-defined parameters, the graphical user interface 100 allows users to create dynamic lists that can be used in calculations and data visualizations without the user needing to know exactly how the information regarding each data field is related to one another in the data source. In the examples provided with respect to FIG. 5A-5D, the user is able to define a dynamic set of data values based on state population and sales (e.g., top sales), and utilize the generated dynamic set of data values to create a data visualization that shows the number of customers in the data source that meet the pre-defined criteria. The user is able to accomplish this without having any knowledge regarding the data structure of the data source or any information regarding how the data fields are related to one another (if at all) in the data source.

In some implementations, as described below with respect to FIGS. 6A-6D, data fields within the data source are automatically joined to one another (e.g., independently of additional user input) to form a relationship that can provide the user with the requested information. The type of join is automatically determined independently of additional user input, and the join is generated on a case-by-case basis. For example, for each dynamic set of data values that is defined using two or more user-defined parameters, a new join is created specifically for the dynamic set of data values in accordance with the user-defined parameters (and in accordance with any user input regarding how the sets of data values generated from the user-defined parameters are to be joined or related to one another). In another example, for each data visualization that is generated, a new join is created between the data fields that are associated with the columns shelf region 120 and the rows shelf region 122 in order to generate the data visualization. When the data visualization utilizes a dynamic set of data values (either directly or as part of a calculation), a join between data fields required to generate the dynamic set of data values is also created.

FIGS. 6A-6D illustrate generating data visualizations from a dynamic set of data values selected based on a user-defined parameter, in accordance with some implementations.

Figure 6A:
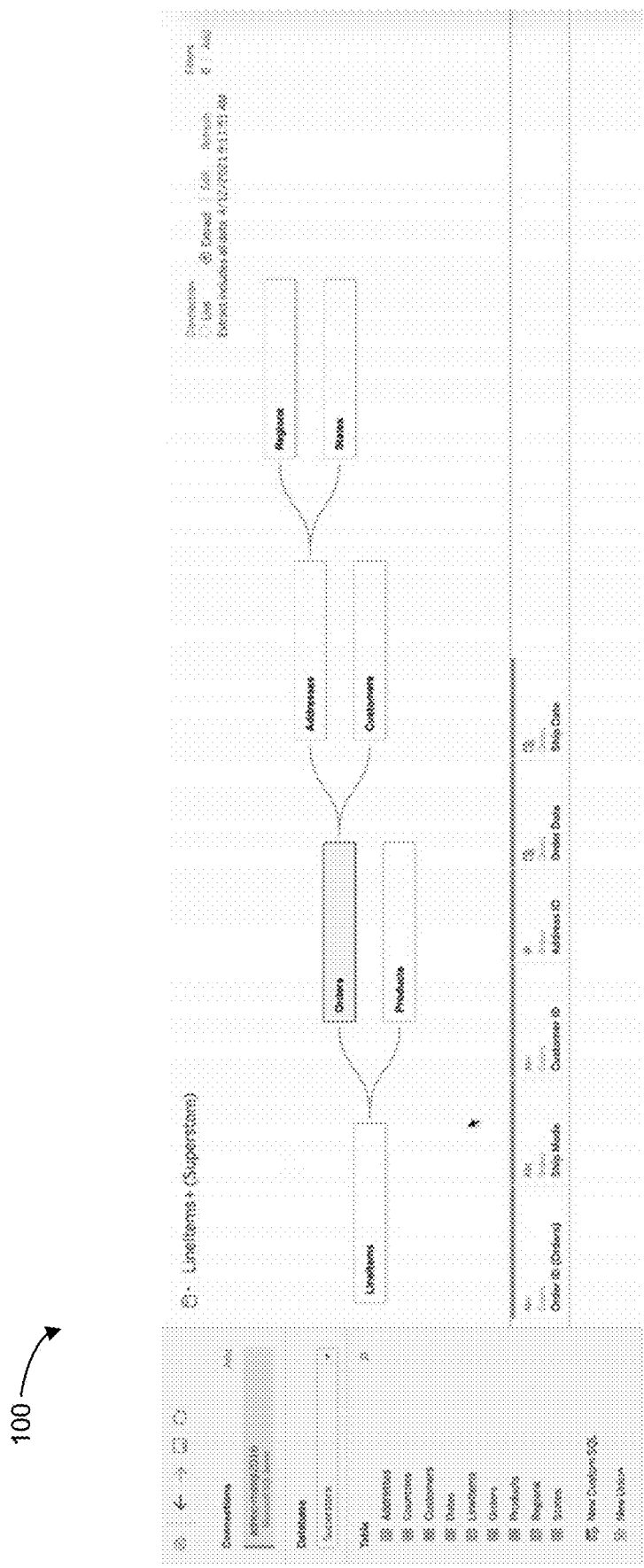
FIGS. 6A-6D illustrate generating data visualizations from a dynamic set of data values selected based on a user-defined parameter, in accordance with some implementations.

FIG. 6A illustrates an object model for a data source (e.g., "Line Items+(Superstore)"). The object model includes a plurality of data objects (e.g., data tables) that each include one or more data fields, and each of the data fields includes at least one data value. The object model shows the relationship between the data objects. In this example, the object model includes 7 data objects that are related to one another by one or more many-to-one relationships with the "one side" being on the right and the "many side" being on the left. For example, an Order object can have many Line Items, but a given Line Item belongs to exactly one Order.

Figure 6B:
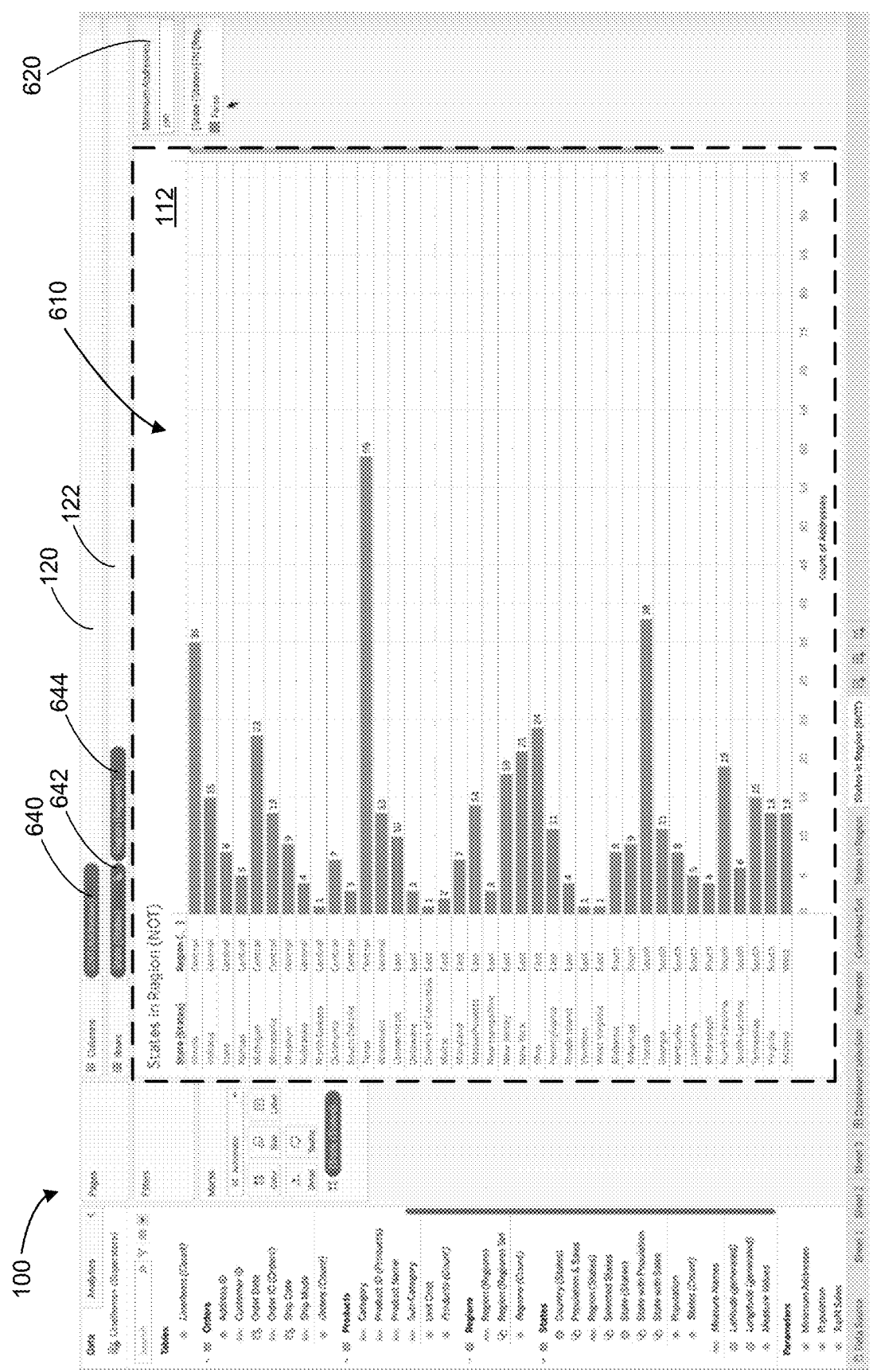

In FIG. 6B, the user has associated the "CNT(Addresses)" data field 640 with the columns shelf region 120, and associated the "State (States)" data field 642 and the "Region (Regions)" data field 644 with the rows shelf region 122. In response to detecting the placement of these data fields in the respective shelf regions, the graphical user interface 100 generates and displays a data visualization 610 in the data visualization region 112. The data visualization 610 is a bar chart that illustrates the number of addresses in each state. In addition to identifying each state as a label along the y-axis, the data visualization also identifies the region to which each state belongs. For example, based on the information provided in by the data visualization 610, a user can discern that the state of Illinois is in the Central region, and that the data source includes 35 addresses in the state of Illinois.

The data visualization 610 utilizes data from the three objects Addresses, Regions, and States shown in the object model in FIG. 6A, so these objects are joined together to extract the needed data.

Figure 6C:
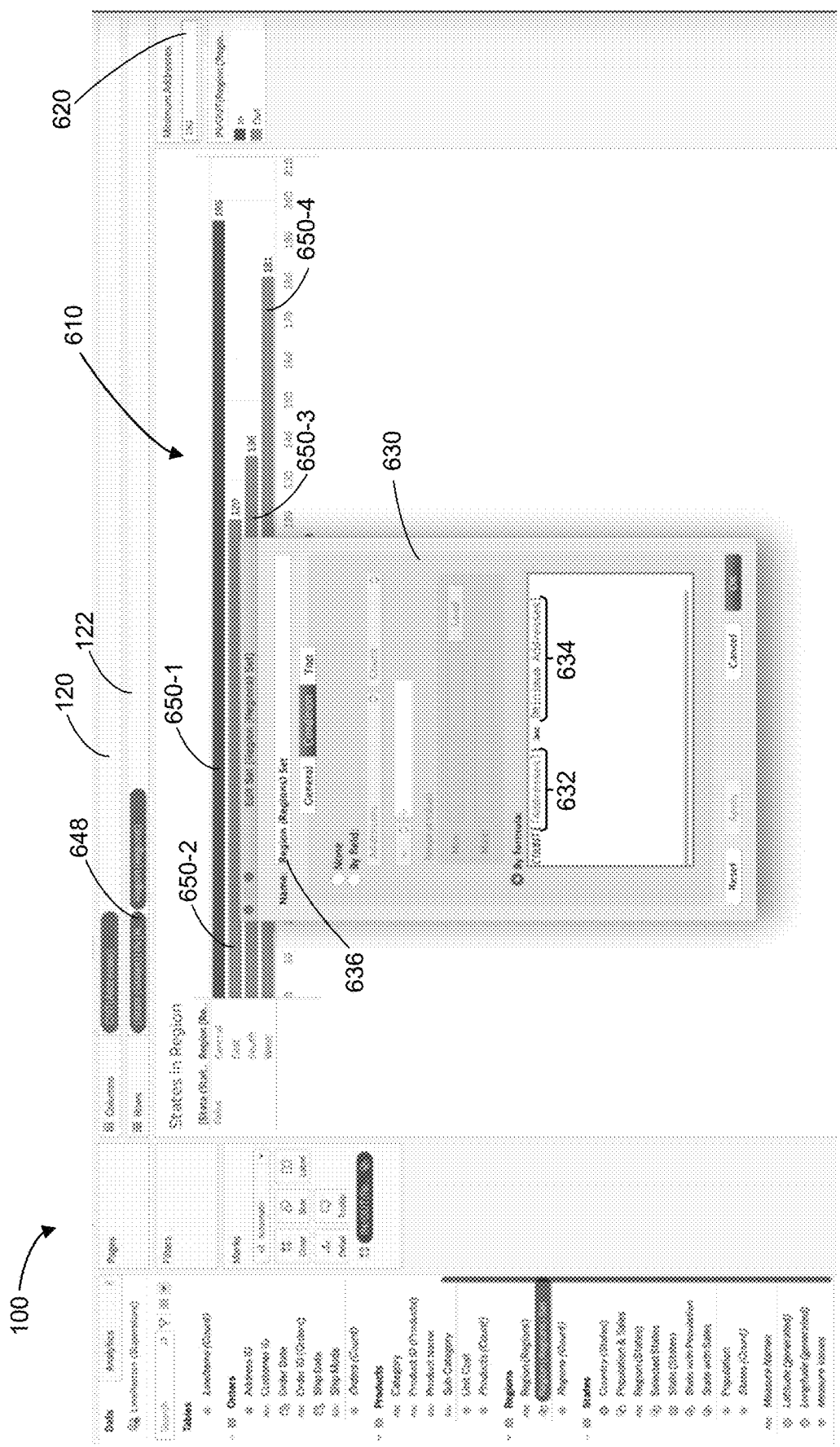

In FIG. 6C, the user generates a dynamic set 636 of data values entitled "Region (Regions) Set", which is defined by a user-defined parameter in the data entry field 620. In this example, the dynamic set 636 is defined to include any regions that has a number of addresses 632 that meets the minimum address criteria 634 (which in this example, is 190 addresses). Thus, the "Region (Regions) Set" dynamic set 636 will include all regions that have at least 190 addresses. While the threshold value of a minimum of 190 addresses is defined via the data entry field 620, the dynamic set 636 uses the parameter based on the configuration window 630 (e.g., a pop-up window) that allows the user to edit the "Region (Regions) Set" dynamic set of data values 636. In this example, the user has defined a dynamic set 636 (e.g., "Region (Regions) Set") to include all regions that have a number of addresses that is greater than or equal to the threshold value provided in the data entry field 620. In this example, the dynamic set of data values 636 includes the Central region (e.g., includes the data value "Central").

Additionally, the user has updated the "States (States)" data field 642 to become a calculation 648. The calculation utilizes the "IN" operator, identifies a dynamic set of data values, and identifies a data field to which the dynamic set of data values should be compared. In response to the association of the calculation 648 with the rows shelf region 122, the data visualization is updated to display a bar chart that includes regions as a y-axis label so that each visual mark corresponds to a distinct region in the United States ("Central," "East," "South," and "West"). The data visualization 610 also includes a number associated with each visual mark, indicating the number of addresses the visual mark represents. For example, the data visualization 610 shows that there are 195 addresses from the data source that are located in the Central region, and 120 addresses from the data source that are located in the East region. Additionally, the visual marks are visually encoded to indicate whether or not the region corresponding to the visual mark is included in the dynamic set of data values. For example, the visual mark 650-1 is visually emphasized (e.g., displayed in a different color) relative to the other visual marks (650-2 through 650-4), according to a legend associated with the data visualization 610, to indicate that the Central region is included in the dynamic set of data values and that the other regions (e.g., "East," "South," and "West") are not included in the dynamic set of data values.

Figure 6D:
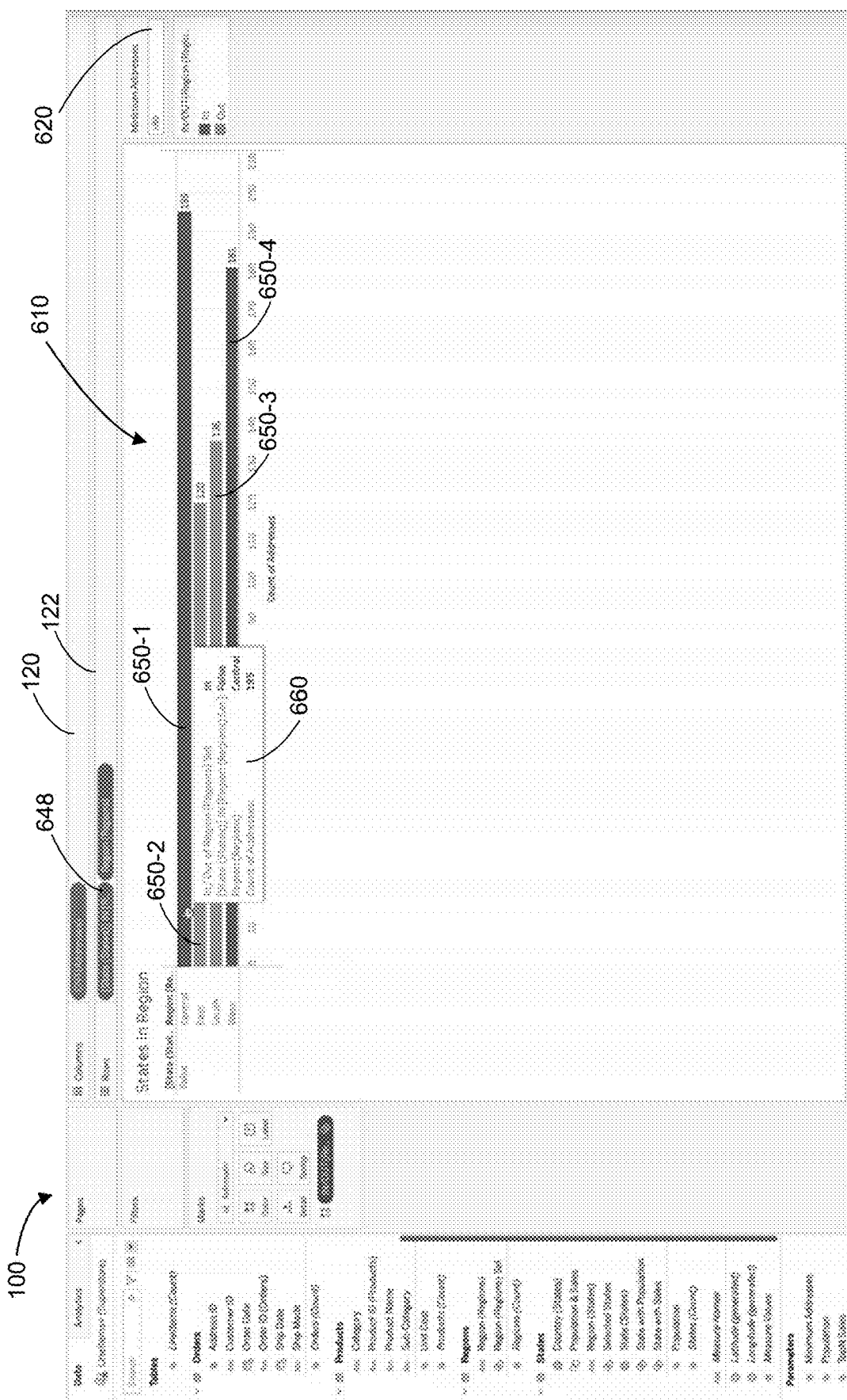
Figure 7A:
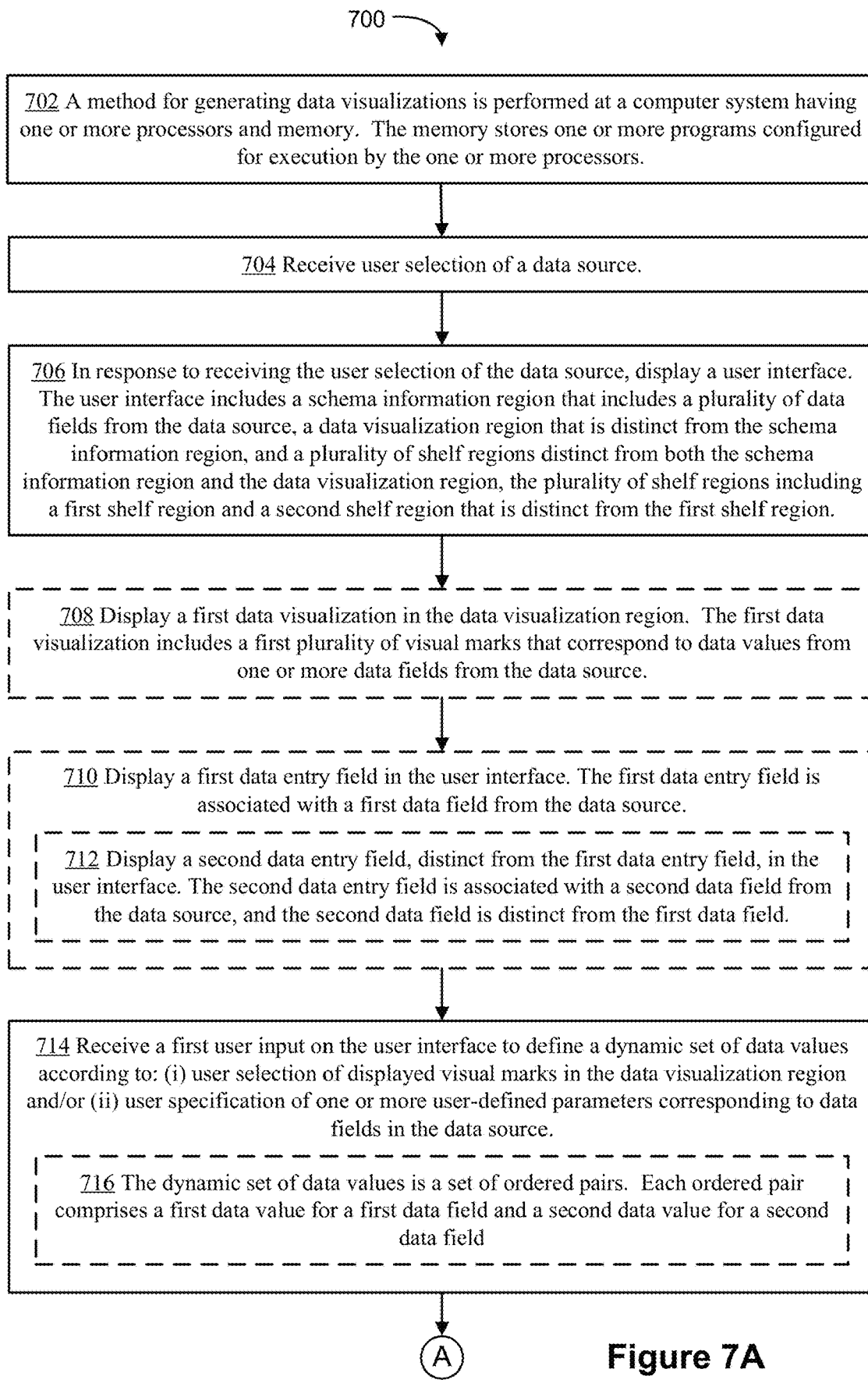
Figure 7D:
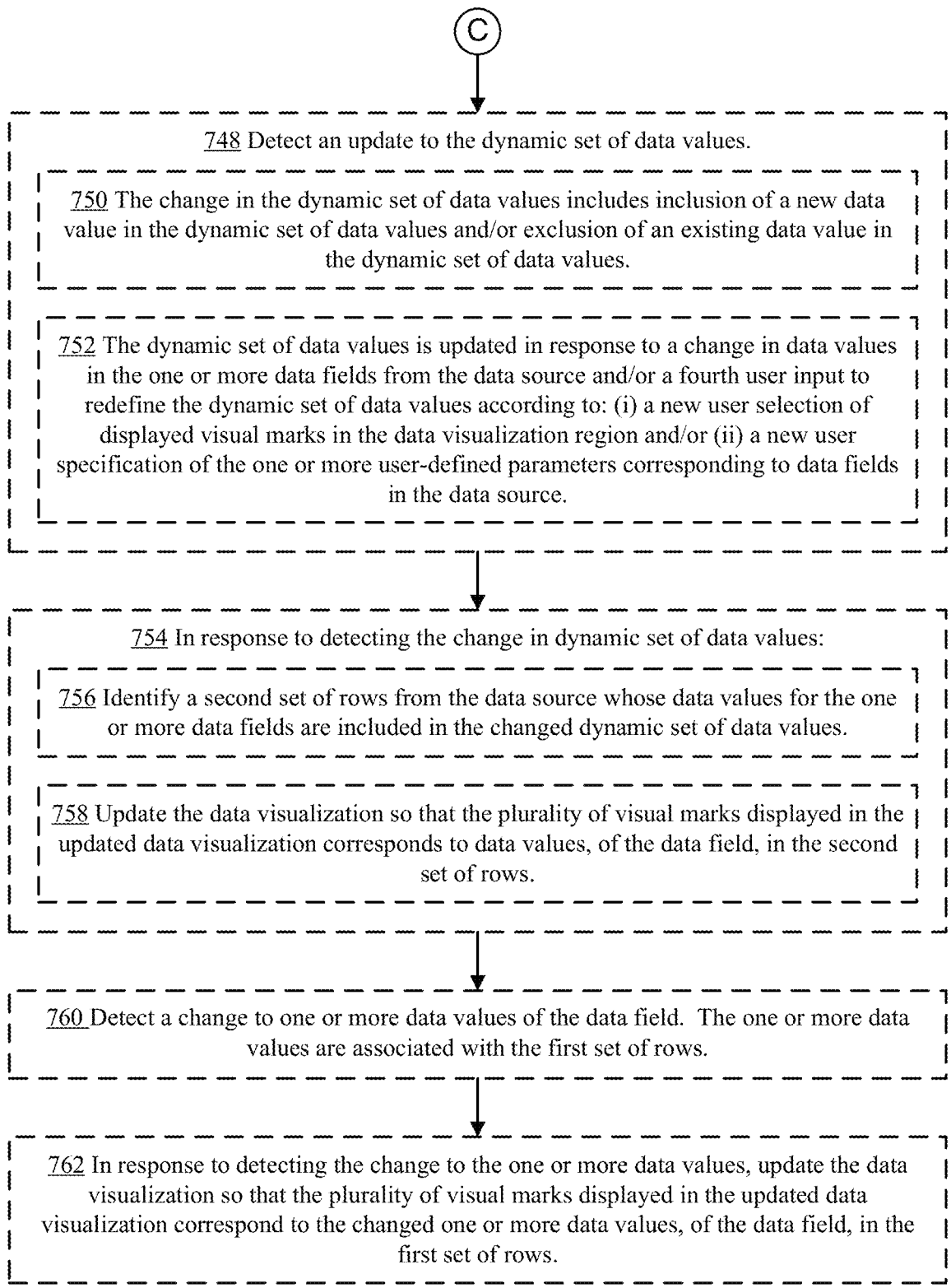

In FIG. 6D, the user has updated (e.g., changed) the threshold value at the data entry field 620. Data values in the dynamic set of data are automatically updated (e.g., automatically changed, independently of additional user input) in response to and in accordance with the change in the threshold value associated with a user-defined parameter used in defining the dynamic set of data values. With the minimum address threshold value being changed from 190 addresses to 180 addresses, the dynamic set of data values now includes both the Central region and the West region. The data visualization 610 is automatically updated (e.g., independently of additional user input) in response to and in accordance with the change in the data values in the dynamic set of data values. In this example, the encoding of visual mark 650-4 is updated to show that the "West" region (corresponding to visual mark 650-4) is also included in the dynamic set of data values.

Additionally, in response to detecting a user gesture at a visual mark 650 (e.g., any of visual marks 650-1 through 650-4), the graphical user interface 100 displays information regarding the visual mark. For example, in response to detecting a user gesture on the visual mark 650-1, the visual mark 650-1 is emphasized relative to other visual marks, and the graphical user interface 100 displays information regarding the visual mark 650-1 in a window 660 (e.g., pop-up window). In this example, the information regarding the visual mark 650-1 includes information regarding whether or not the visual mark 650-1 corresponds to a region that is included in the dynamic set of data values (e.g., "In," indicating that the region corresponding to visual mark 650-1 is included in the dynamic set of data values), which region the visual mark 650-1 corresponds to ("Central"), and the count of addresses that the visual mark 650-1 represents (195 addresses).

FIGS. 7A-7D provide a flowchart of a method 700 for generating (702) data visualizations (e.g., the data visualizations 412, 530, 610), in accordance with some implementations. The method 700 is performed (702) at a computer having a display, one or more processors, and memory. The memory stores one or more programs (e.g., a data visualization application 222) configured for execution by the one or more processors. The computer system receives (704) user selection of a data source. In response to receiving the user selection of the data source, the computer system displays (706) a user interface 100. The user interface 100 includes a schema information region 110 including a plurality of data fields from the data source, a data visualization region 112 that is distinct from the schema information region, and a plurality of shelf regions that are distinct from both the schema information region 110 and the data visualization region 112. The plurality of shelf regions include a first shelf region and a second shelf region (e.g., a columns shelf region 120 and a rows shelf region 122).

In some implementations, the computer system displays (708) a first data visualization in the data visualization region 112. (The first data visualization 410 is distinct from the data visualization 412 generated and displayed later.) The first data visualization 410 includes a first plurality of visual marks 420 that correspond to data values from the one or more columns from the data source. The first data visualization has a first visualization type (e.g., map, scatter plot, bar chart, line graph, pie chart, or table).

In some implementations, the computer system displays (710) a first data entry field, (e.g., the data entry fields 520 and 620) in the user interface 100. The first data entry field is associated with a first data field from the data source (e.g., a parameter, such as "State Population" or "Sales"). In some implementations, the computer system displays (712) a second data entry field (e.g., the user interface affordance 522) in the user interface 100. The second data entry field 522 is distinct from the first data entry field 520, and the second data entry field 522 is associated with a second data field from the data source (e.g., associated with the "TopN Sales" parameter or "Sales" data field). The second data field is distinct from the first data field.

The computer system receives (714) a first user input on the user interface 100 to define a dynamic set of data values (such as the dynamic sets 434 and 636) according to: (i) user selection of displayed visual marks in the data visualization region 112 (e.g., user selection of at least a subset of visual marks 420) and/or (ii) user specification of one or more user-defined parameters corresponding to data fields in the data source (e.g., user specification of user-defined parameters and/or threshold values in a data entry field 520 and/or 620, in a user interface affordance 522, and/or in a window 532 and/or 640). In some instances, the dynamic set consists of (716) ordered pairs. Each ordered pair has a first data value for a first data field and a second data value for a second data field. Some implementations extend this to tuples with more than two elements, such as ordered triples or ordered quadruples. Within a single dynamic set, all of the items must be compatible. The items cannot be tuples of different sizes, and the data types for a specific element in tuples must be the same. For example, if a dynamic set has ordered pairs, then all of the items in the dynamic set must be ordered pairs. Within this example, the data types for all of the first elements in the ordered pairs must be the same, and the data types for all of the second elements in the ordered pairs must be the same. In some cases, ordered pairs are needed to guarantee uniqueness. For example, many city names in the United States exist in multiple states, such as the city Portland in both Oregon and Maine. There are 28 distinct states that have a city named "Albany." Therefore, when working with cities, it is useful to use (City, State) ordered pairs.

In some instances, receiving the first user input to define a dynamic set of data values entails receiving (718) user selection of at least a visual mark of the plurality of first visual marks 420 in the first data visualization 410.

In some implementations, in response to receiving the first user input, the computer system displays (720) an icon, representing the dynamic set, in the schema information region 110. FIG. 4I illustrates an example where, in response to receiving user input to generate the dynamic set of data values 434 called "States with Population", a data field icon corresponding to "States with Population" is displayed in the schema information region 110.

In some instances, the first user input includes (722) user input in the first data entry field, to specify a first parameter. The first parameter defines a range of data values for the first data field. In some instances, a range is specified as a continuous numeric interval, which can be one-sided or two-sided (e.g., all values<=5.0. all values in the range of 1.0 to 2.0, or all values>10.0). In some instances, a range is specifies as a list of discrete values (e.g., a list of specific products or a list of specific states). In some instances, the first user input further includes (724) user input in the second data entry field, specifying a second parameter. The second parameter defines a set of data values for the second data field.

The computer system receives (726) a second user input to define a calculation (e.g., the calculations 312 and 512) to compare data values from one or more data fields from the data source to data values in the dynamic set. The calculation is associated with the first shelf region of the plurality of shelf regions. In some instances, the second user input specifies (728) that the calculation compares data values from the first data field to the data values in first elements of the ordered pairs in the dynamic set. Further, in some instances, the second user input specifies (730) that the calculation compares data values from the second data field to data values in second elements of the ordered pairs in the dynamic set. In general, when matching ordered pairs of data values in a dynamic set, an individual row from the data source must match both the first element and the second element from a single ordered pair in the dynamic set. In some implementations, a user define a calculation that utilizes only one component of a dynamic set of ordered pairs. For example, if a user has created a dynamic set of ordered (City, State) pairs, a user may utilize this dynamic set in a calculation that only needs to look at State (looking at just City would likely lead to erroneous results). In some implementations, the second input defines (732) a custom calculation that includes (i) the one or more data fields, (ii) the "IN" operator, and (iii) the dynamic set. This is illustrated in the examples above.

In response to receiving the second user input, the computer system identifies (734) (e.g., automatically, without additional user input) a first set of rows from the data source whose data values for the one or more data fields are included in the dynamic set of data values.

In some implementations, in response to receiving the second user input, the computer system displays (736) results of the calculation in the data visualization. For example, in response to receiving a user input to define a calculation that compares data values from one or more data fields from the data source to data values in the dynamic set of data values, the data visualization may display a table or chart that indicates which data values in the one or more data fields are included in the dynamic set of data values and which data values in the one or more data fields are not included in the dynamic set of data values. In some implementations, the indication is provided via visually encoded characteristics of visual marks, such as color-coding according to a legend associated with the data visualization. In some implementations, the indication is provided via text, such as labels "True" (e.g., for data values that are included in the dynamic set of data values) and "False" (e.g., for data values that are not included in the dynamic set of data values).

In some implementations, in response to receiving the second user input, the computer system generates (738) a calculated data field corresponding to the calculation and displays the calculated data field in the schema information region 110. The calculated data field is a system generated data field that is different from the raw data fields in the data source.

In some instances, identifying the first set of rows from the data source whose data values are included in the dynamic set of data values entails (740) identifying rows whose data values for the first data field are in the range defined by the first parameter. FIGS. 5A-5D and 6C illustrate receiving user input at a data entry field 520 that defines a dynamic set of data values.

In some instances, identifying the first set of rows from the data source includes (742) identifying rows from the data source that include: (i) data values for the first data field in the range defined by the first parameter and (ii) data values in the second data field in the set of data values defined by the second parameter. FIGS. 5C and 5D illustrate defining a dynamic set of data values based on user input provided in data entry fields 520 and 522.

The computing system receives (744) a third user input to place a data field from the data source into the second shelf region of the plurality of shelf regions. The data field is distinct from the dynamic set of data values and distinct from the calculation. In response to the third user input, the computer system displays (746) a data visualization. The data visualization includes a plurality of visual marks corresponding to data values, of the data field, in the first set of rows.

In some implementations, the data visualization has a second visualization type that is different from the first visualization type. FIGS. 4A-4K illustrate an example of a first data visualization 410 that includes a plurality of visual marks 420. The first data visualization 410 is displayed prior to receiving the first user input 460 to select a subset of the plurality of visual marks 420 (e.g., the selected visual marks 422 are a subset of visual marks 420), and the first data visualization 410 is distinct from the data visualization 412.

In some instances, the computing device detects (748) an update to the dynamic set of data values. In some instances, the change in the dynamic set of data values includes (750) inclusion of a new data value in the dynamic set of data values and/or exclusion of an existing data value from the dynamic set of data values. For example, the change in the dynamic set of data values may be due to a user selection to add a data value associated with visual mark to the dynamic set of data values or to remove a data value associated with a visual mark from the dynamic set of data values. In another example, the change in the dynamic set of data values may be due to changes in the data source. For instance, the data source may be updated (e.g., in real time, at predefined intervals, or manually by a user) such that new data values are added to the data source, existing data values are removed from the data source, and/or data values in the data source are changed to have new values.

In some instances, the dynamic set of data values is updated (752) in response to a change in data values in the one or more data fields from the data source and/or a fourth user input to redefine the dynamic set of data values according to: (i) a new user selection of displayed visual marks in the data visualization region and/or (ii) a new user specification of the one or more user-defined parameters corresponding to data fields in the data source. In some instances, the changed data values in the one or more columns are due to user input or independent of user input. For example, if the user-defined parameter for inclusion in a dynamic set of data values is defined as the last 14 days, then the values in the dynamic set will change each day independently of user input to include the most recent 14 days. In another example, a user may update information stored in the data source and input a new value. The new value may no longer satisfy the user-defined parameter. In such cases, the data value would be automatically removed from the dynamic set of data values in response to the user update. Thus, the dynamic set of data values is automatically updated in response to changes in the data source, changes due to user selection, and/or changes in the user-defined parameters. The user does not need to manually edit the dynamic set of data values.

In response to detecting the change in the dynamic set of data values (754), the computing system identifies (756) a second set of rows from the data source whose data values for the one or more data fields are included in the changed dynamic set of data values. The computing system also updates (758) the data visualization so that the plurality of visual marks displayed in the updated data visualization corresponds to data values, of the data field, in the second set of rows. In some implementations, the data visualization is dynamic, updating in accordance with changes in the dynamic set of data values. In some implementations, the data visualization (e.g., the visual marks in the data visualization) are updated independently of additional user input.

In some instances, the computing system detects (760) a change to one or more data values of the data field. The one or more data values are associated with the first set of rows. In response to detecting the change in the one or more data values in the data field, the computing system updates (762) the data visualization so that the plurality of visual marks displayed in the updated data visualization correspond to the changed one or more data values, of the data field, in the first set of rows.

In some instances, a dynamic set of data values comprises ordered pairs. Each ordered pair has a first data value corresponding to a first data field and a second data value corresponding to a second data field. For example, a dynamic set may include the ordered pair ("Portland", "Oregon"), where Portland corresponds to the data field City in the data source, and "Oregon" corresponds to the data field State in the data source.

In some instances, the second user input defines the calculation to compare data values from the ordered pairs to two data fields in the data source. In this case, the data value for the first data field must match the first component of the ordered pair and the data value for the second data field must match the second component of the ordered pair. For example, if the dynamic set has the single ordered pair ("Portland", "Oregon"), then "Portland, Oregon" would be "in" dynamic set, but "Portland, Maine" would not be included in the dynamic set since "Maine" does not match the second data value. (Of course, a dynamic set can include both ("Portland", "Oregon") and ("Portland", "Maine") if desired.)

In some implementations, a custom calculation can access a dynamic set using the following syntax: (i) the one or more data fields, (ii) the "IN" operator, and (iii) the dynamic set of data values. For example, the calculation 312, shown in FIG. 4B, includes a data field 313, the "IN" operator, and a dynamic set of data values 434. In another example, the calculation 512, shown in FIG. 5A, includes a data field 513, the "IN" operator, and a dynamic set of data values 514.

In some instances, a custom calculation is generated in response to receiving user input in a shelf region. In some instances, a calculation is generated in response to receiving user input in a window to edit a data field or a window to generate or edit a calculated field.

In some implementations, the method includes receiving a user input to update the data visualization. In response to the user input to update the data visualization, the method includes (1) identifying a third set of rows from the data source whose data values for the one or more data fields are included in the dynamic set of data values, and (2) generating and displaying an updated data visualization in the data visualization region. The updated data visualization includes a plurality of visual marks corresponding to data values, of the data field, in the third set of rows.

In some implementations, the method includes receiving a user input to specify a time interval at which to update the data visualization. When that time interval has passed since the data visualization was last updated, the method includes identifying a third set of rows from the data source whose data values for the one or more data fields are included in the dynamic set of data values. The method then generates and displays an updated data visualization in the data visualization region. The updated data visualization includes a plurality of visual marks corresponding to data values, of the data field, in the third set of rows.

In some instances, the third set of rows differs from the first set of rows by at least one row (e.g., one member of the set). In some instances, the third set of rows is identical to the first set of rows. In some instances, the third set of rows and the first set of rows include at lease one row (e.g., one member of the set) in common.

In some implementations, the method includes determining a new set of rows from the data source whose data values for the one or more data fields are included in the dynamic set of data values each time the data visualization is updated.

The disclosed implementations typically provide "instant" or "real-time" updates or feedback based on user actions. In practice, "instant" or "real-time" means within a short period of time and without additional user input. For example, the "instant" or "real-time" updates may occur within one twentieth of a second, one tenth of a second, one half of a second, or a second. As computer processors become more powerful, instant updates can occur more quickly and/or for even more complex operations.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for generating data visualizations, comprising:
    at a computer having a display, one or more processors, and memory storing one or more programs configured for execution by the one or more processors:
        receiving user selection of a data source;
        displaying a first data visualization in a user interface, the first data visualization including a first plurality of visual marks that correspond to data values from one or more data fields from the data source;
        receiving a first user input on the user interface to define a dynamic set of data values that is determined in real time based on the displayed first data visualization, according to user selection of one or more of the displayed first plurality of visual marks in the first data visualization;

receiving a second user input to define a calculation that compares data values from one or more data fields from the data source to data values in the dynamic set of data values, wherein the calculation is associated with a first shelf region in the user interface;

in response to receiving the second user input, identifying a first set of rows from the data source whose data values for the one or more data fields are included in the dynamic set of data values;

receiving a third user input to place a data field from a schema information region of the user interface into a second shelf region of the user interface, the data field being distinct from the dynamic set of data values and distinct from the one or more data fields;

in response to the third user input, generating and displaying a data visualization, the data visualization including a plurality of visual marks corresponding to data values, of the data field, in the first set of rows;

detecting an update to the dynamic set of data values in accordance with a fourth user input to redefine the dynamic set of data values according to a new user selection of at least one of the displayed first plurality of visual marks in the first data visualization; and in response to detecting the update to the dynamic set of data values:
identifying a second set of rows from the data source whose data values for the one or more data fields are included in the updated dynamic set of data values; and
updating the data visualization so that the plurality of visual marks displayed in the updated data visualization correspond to data values, of the data field, in the second set of rows.

2. The method of claim 1, wherein the update to the dynamic set of data values includes at least one of:
inclusion of a new data value in the dynamic set of data values; or
exclusion of an existing data value in the dynamic set of data values.

3. The method of claim 1, wherein the update to the dynamic set of data values is further in accordance with:
a change in data values in the one or more data fields from the data source.

4. The method of claim 1, further comprising:
detecting a change to one or more data values of the data field, wherein the one or more data values are associated with the first set of rows; and
in response to detecting the change to the one or more data values, updating the data visualization so that the plurality of visual marks displayed in the updated data visualization correspond to the changed one or more data values, of the data field, in the first set of rows.

5. The method of claim 1, further comprising:
in response to receiving the second user input, displaying results of the calculation in the user interface.

6. The method of claim 1, further comprising:
in response to receiving the second user input, generating a calculated data field corresponding to the calculation and displaying the calculated data field in the schema information region.

7. The method of claim 1, further comprising:
in response to receiving the first user input, displaying an icon, representing the dynamic set, in the schema information region.

8. The method of claim 1, wherein:
the dynamic set of data values is a set of ordered pairs, each ordered pair comprising a first data value for a first data field and a second data value for a second data field; and
the second user input defines the calculation to compare data values from the first data field to the data values in first elements of the ordered pairs in the dynamic set of data values.

9. The method of claim 8, wherein the second user input further defines the calculation to compare data values from the second data field to data values in second elements of the ordered pairs in the dynamic set of data values.

10. The method of claim 1, wherein the second user input specifies (i) the one or more data fields, (ii) an "IN" operator, and (iii) the dynamic set of data values.

11. A computing device, comprising:
one or more processors;
memory;
a display; and
one or more programs stored in the memory and configured for execution by the one or more processors, the one or more programs comprising instructions for:
receiving user selection of a data source;
displaying a first data visualization in a user interface, the first data visualization including a first plurality of visual marks that correspond to data values from one or more data fields from the data source;
receiving a first user input on the user interface to define a dynamic set of data values that is determined in real time based on the displayed first data visualization, according to user selection of one or more of the displayed first plurality of visual marks in the first data visualization;
receiving a second user input to define a calculation that compares data values from one or more data fields from the data source to data values in the dynamic set of data values, wherein the calculation is associated with a first shelf region in the user interface;
in response to receiving the second user input, identifying a first set of rows from the data source whose data values for the one or more data fields are included in the dynamic set of data values;
receiving a third user input to place a data field from a schema information region of the user interface into a second shelf region of the user interface, the data field being distinct from the dynamic set of data values and distinct from the one or more data fields;
in response to the third user input, generating and displaying a data visualization, the data visualization including a plurality of visual marks corresponding to data values, of the data field, in the first set of rows;
detecting an update to the dynamic set of data values in accordance with a fourth user input to redefine the dynamic set of data values according to a new user selection of at least one of the displayed first plurality of visual marks in the first data visualization; and
in response to detecting the update to the dynamic set of data values:
identifying a second set of rows from the data source whose data values for the one or more data fields are included in the updated dynamic set of data values; and
updating the data visualization so that the plurality of visual marks displayed in the updated data visualization correspond to data values, of the data field, in the second set of rows.

12. The computing device of claim 11, wherein the one or more programs further comprise instructions for:
  detecting a change to one or more data values of the data field, wherein the one or more data values are associated with the first set of rows; and
  in response to detecting the change to the one or more data values, updating the data visualization so that the plurality of visual marks displayed in the updated data visualization correspond to the changed one or more data values, of the data field, in the first set of rows.

13. The computing device of claim 11, wherein the one or more programs further comprise instructions for:
  in response to receiving the second user input, displaying results of the calculation in the user interface.

14. The computing device of claim 11, wherein the one or more programs further comprise instructions for:
  in response to receiving the second user input, generating a calculated data field corresponding to the calculation and displaying the calculated data field in the schema information region.

15. A non-transitory computer readable storage medium storing one or more programs configured for execution by a computing device having one or more processors, memory, and a display, the one or more programs comprising instructions for:
  receiving user selection of a data source;
  displaying a first data visualization in a user interface, the first data visualization including a first plurality of visual marks that correspond to data values from one or more data fields from the data source;
    receiving a first user input on the user interface to define a dynamic set of data values that is determined in real time based on the displayed first data visualization, according to user selection of one or more of the displayed first plurality of visual marks in the first data visualization;
    receiving a second user input to define a calculation that compares data values from one or more data fields from the data source to data values in the dynamic set of data values, wherein the calculation is associated with a first shelf region in the user interface;
    in response to receiving the second user input, identifying a first set of rows from the data source whose data values for the one or more data fields are included in the dynamic set of data values;
    receiving a third user input to place a data field from a schema information region of the user interface into a second shelf region of the user interface, the data field being distinct from the dynamic set of data values and distinct from the one or more data fields;
    in response to the third user input, generating and displaying a data visualization, the data visualization including a plurality of visual marks corresponding to data values, of the data field, in the first set of rows;
    detecting an update to the dynamic set of data values in accordance with a fourth user input to redefine the dynamic set of data values according to a new user selection of at least one of the displayed first plurality of visual marks in the first data visualization; and
    in response to detecting the update to the dynamic set of data values:
      identifying a second set of rows from the data source whose data values for the one or more data fields are included in the updated dynamic set of data values; and
      updating the data visualization so that the plurality of visual marks displayed in the updated data visualization correspond to data values, of the data field, in the second set of rows.

16. The non-transitory computer readable storage medium of claim 15, wherein:
  the dynamic set of data values is a set of ordered pairs, each ordered pair comprising a first data value for a first data field and a second data value for a second data field; and
  the second user input defines the calculation to compare data values from the first data field to the data values in first elements of the ordered pairs in the dynamic set of data values.

17. The non-transitory computer readable storage medium of claim 16, wherein the second user input further defines the calculation to compare data values from the second data field to data values in second elements of the ordered pairs in the dynamic set of data values.

18. The non-transitory computer readable storage medium of claim 15, wherein the second user input specifies (i) the one or more data fields, (ii) an "IN" operator, and (iii) the dynamic set of data values.

* * * * *